(12) United States Patent
Ohta et al.

(10) Patent No.: US 11,545,699 B2
(45) Date of Patent: Jan. 3, 2023

(54) SOLID STATE BATTERY AND SOLID STATE BATTERY MANUFACTURING METHOD

(71) Applicant: HONDA MOTOR CO., LTD., Tokyo (JP)

(72) Inventors: Masahiro Ohta, Wako (JP); Wataru Shimizu, Wako (JP); Toru Sukigara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 16/838,068

(22) Filed: Apr. 2, 2020

(65) Prior Publication Data
US 2020/0343591 A1    Oct. 29, 2020

(30) Foreign Application Priority Data

Apr. 24, 2019   (JP) .............................. JP2019-082954

(51) Int. Cl.
*H01M 10/0583*   (2010.01)
*H01M 50/466*    (2021.01)
(Continued)

(52) U.S. Cl.
CPC ..... *H01M 10/0583* (2013.01); *H01M 50/466* (2021.01); *H01M 4/0404* (2013.01);
(Continued)

(58) Field of Classification Search
CPC ......... H01M 10/0583; H01M 10/0562; H01M 10/056; H01M 50/46; H01M 50/463;
(Continued)

(56) References Cited

U.S. PATENT DOCUMENTS

| | | | | |
|---|---|---|---|---|
| 2014/0272537 A1* | 9/2014 | Kretschmar | ........ | H01M 50/538 429/149 |
| 2016/0118637 A1* | 4/2016 | Narita | .................... | H01G 11/28 429/140 |
| 2020/0358133 A1* | 11/2020 | Baba | .................. | H01M 50/531 |

FOREIGN PATENT DOCUMENTS

| | | |
|---|---|---|
| JP | 2002-305030 | 10/2002 |
| JP | 2005-243455 | 9/2005 |

(Continued)

OTHER PUBLICATIONS

English translation of JP 2019046577A, Power storage device and method of manufacturing bag shaped separator, Mar. 22, 2019, Toyota (Year: 2019).*

(Continued)

*Primary Examiner* — Matthew T Martin
*Assistant Examiner* — Adam J Francis
(74) *Attorney, Agent, or Firm* — Amin, Turocy & Watson, LLP

(57) ABSTRACT

What is provided is a solid state battery and a solid state battery manufacturing method capable of more reliably preventing short-circuiting. A solid state battery includes: a first electrode piece in which a first electrode active material layer is formed on a first current collector layer; a second electrode piece in which a second electrode active material layer is formed on a second current collector layer; and a bag-shaped solid electrolyte layer which accommodates the first electrode piece, wherein the first electrode piece accommodated in the bag-shaped solid electrolyte layer and the second electrode piece are laminated so as to overlap each other in a plan view so that the first electrode active material layer and the second electrode active material layer are disposed so as to face each other with the solid electrolyte layer interposed therebetween.

10 Claims, 8 Drawing Sheets

(51) Int. Cl.
*H01M 50/46* (2021.01)
*H01M 4/04* (2006.01)
*H01M 4/139* (2010.01)
*H01M 10/0525* (2010.01)
*H01M 10/056* (2010.01)

(52) U.S. Cl.
CPC .......... *H01M 4/139* (2013.01); *H01M 10/056* (2013.01); *H01M 10/0525* (2013.01); *H01M 50/46* (2021.01); *H01M 2300/0065* (2013.01)

(58) Field of Classification Search
CPC ............. H01M 50/466; H01M 50/531; H01M 50/533; H01M 50/538; H01M 50/54; H01M 10/0525; H01M 10/0585; H01M 4/0404; H01M 4/139; H01M 4/667
See application file for complete search history.

(56) References Cited

FOREIGN PATENT DOCUMENTS

| | | | | |
|---|---|---|---|---|
| JP | 2007-149701 | | 6/2007 | |
| JP | 5354646 | | 11/2013 | |
| JP | 2015-118870 | | 6/2015 | |
| JP | 2015118788 A | * | 6/2015 | ............. Y02E 60/10 |
| JP | 2016-511522 | | 4/2016 | |
| JP | 2016-085976 | | 5/2016 | |
| JP | 2017-076478 | | 4/2017 | |
| JP | 2019046577 A | * | 3/2019 | |

OTHER PUBLICATIONS

English Translation of JP 2015118788A, Folding Battery, Toyota Motor Corp, Jun. 25, 2015 (Year: 2015).*
Japanese Office Action for Japanese Patent Application No. 2019-082954 dated Apr. 5, 2022.

* cited by examiner

SOLID STATE BATTERY AND SOLID STATE BATTERY MANUFACTURING METHOD

CROSS-REFERENCE TO RELATED APPLICATION

Priority is claimed on Japanese Patent Application No. 2019-082954, filed Apr. 24, 2019, the content of which is incorporated herein by reference.

BACKGROUND OF THE INVENTION

Field of the Invention

The present invention relates to a solid state battery and a solid state battery manufacturing method.

Description of Related Art

A solid state battery in which a solid electrolyte is disposed between a positive electrode and a negative electrode is notable for its higher safety, wider usable temperature range, and shorter charging time compared to a conventional lithium secondary battery.

As a solid state battery manufacturing method, for example, there is proposed an integration method of pressure-bonding a first laminated body and a second laminated body to each other, the first laminated body being formed such that a positive electrode mixture layer as a positive electrode layer is pressure-bonded to a first solid electrolyte layer and the second laminated body being formed such that a negative electrode mixture layer as a negative electrode layer is pressure-bonded to a second solid electrolyte layer (for example, see Japanese Unexamined Patent Application, First Publication No. 2015-118870).

Further, as a laminated secondary battery, for example, a current collector is located at a front end portion of an end surface of at least one of a positive electrode and a negative electrode laminated with a separator interposed therebetween in a direction orthogonal to a laminating direction, active material layers formed on both surfaces of the current collector are formed at positions separated from the front end portion of the current collector, and a melted and solidified portion is formed on an outer peripheral portion of the active material layer in a direction orthogonal to the laminating direction (for example, see Japanese Patent No. 5354646)

SUMMARY OF THE INVENTION

In the conventional solid state battery, it is required to more reliably prevent short-circuiting.

The present invention has been made in view of the above-described circumstances and an object thereof is to provide a solid state battery and a solid state battery manufacturing method capable of more reliably preventing a short-circuit.

In order to achieve the above-described object, the present invention provides the following means.

[1] A solid state battery including: a first electrode piece in which a first electrode active material layer is formed on a first current collector layer; a second electrode in which a second electrode active material layer is formed on a second current collector layer; and a bag-shaped solid electrolyte layer which accommodates the first electrode piece, wherein the first electrode piece accommodated in the bag-shaped solid electrolyte layer and the second electrode are laminated so as to overlap each other in a plan view so that the first electrode active material layer and the second electrode active material layer are disposed so as to face each other with a solid electrolyte layer interposed therebetween.

[2] The solid state battery according to [1], further including: a bellows-folded electrode sheet, wherein the electrode sheet includes a first connection portion which is formed by the first current collector layer and extends in a belt shape, a plurality of the first electrode pieces which are connected to a side surface of the first connection portion and are respectively accommodated in the bag-shaped solid electrolyte layer, a second connection portion which is formed by the second current collector layer and extends in a belt shape, and a plurality of second electrode pieces which are connected to a side surface of the second connection portion, wherein the first electrode piece is formed such that the first electrode active material layer is formed on both surfaces of the first current collector layer and the second electrode piece is formed such that the second electrode active material layer is formed on both surfaces of the second current collector layer, wherein the first connection portion and the second connection portion are disposed so as to face each other in a plan view and a first region and a second region are alternately formed between the first connection portion and the second connection portion in a longitudinal direction, the first region being formed such that the bag-shaped solid electrolyte layer accommodating the first electrode piece and the second electrode piece are laminated and the second region being formed such that the bag-shaped solid electrolyte layer and the second electrode piece are laminated in a laminating order opposite to that of the first region, and wherein the electrode sheet is folded in a bellows shape so that the first region and the second region are alternately laminated.

[3] The solid state battery according to [1], further including: a bellows-folded electrode sheet, wherein the electrode sheet includes a first connection portion which is formed by the first current collector layer and extends in a belt shape, a plurality of the first electrode pieces which are connected to a side surface of the first connection portion and are respectively accommodated in the bag-shaped solid electrolyte layer, a second connection portion which is formed by the second current collector layer and extends in a belt shape, and the second electrode which is connected to a side surface of the second connection portion and extends in a belt shape, wherein the first electrode piece is formed such that the first electrode active material layer is formed on both surfaces of the first current collector layer and the second electrode is formed such that the second electrode active material layer is formed on both surfaces of the second current collector layer, wherein the first connection portion and the second connection portion are disposed so as to face each other in a plan view and a first region and a second region are alternately formed between the first connection portion and the second connection portion in a longitudinal direction, the first region being formed such that the bag-shaped solid electrolyte layer accommodating the first electrode piece and the second electrode are laminated and the second region being formed such that the bag-shaped solid electrolyte layer and the second electrode are laminated in a laminating order opposite to that of the first region, and wherein the electrode sheet is folded in a bellows shape so that the first region and the second region are alternately laminated.

[4] The solid state battery according to any one of [1] to [3], wherein the first electrode active material layer is a positive electrode active material layer and the second electrode active material layer is a negative electrode active material layer.

[5] The solid state battery according to any one of [1] to [4], wherein the bag-shaped solid electrolyte layer is formed by a solid electrolyte layer sheet and the solid electrolyte layer sheet disposed so as to cover both surfaces of the first electrode piece having a rectangular shape in a plan view is formed in a bag shape by being bonded along two facing sides of the first electrode piece.

[6] A method of manufacturing the solid state battery according to any one of [1] to [5], including: forming a first sheet including a first connection portion which is formed by a first current collector layer and extends in a belt shape and a plurality of first electrode pieces which are connected to a side surface of the first connection portion, have the first electrode active material layer formed on both surfaces of the first current collector layer, and have a rectangular shape in a plan view; disposing a solid electrolyte layer sheet on both surfaces of the first electrode piece so as to continuously cover a plurality of the first electrode pieces by exposing the first connection portion; bonding the solid electrolyte layer sheet between the adjacent first electrode pieces along an end surface of the first electrode piece in a direction orthogonal to a longitudinal direction of the first sheet; and forming a bag-shaped solid electrolyte layer accommodating each of the plurality of first electrode pieces by cutting the solid electrolyte layer sheet between the adjacent first electrode pieces.

Since the solid state battery of the present invention includes the first electrode piece in which the first electrode active material layer is formed on the first current collector layer and the second electrode in which the second electrode active material layer is formed on the second current collector layer and the first electrode piece accommodated in the bag-shaped solid electrolyte layer and the second electrode are laminated so as to overlap each other in a plan view so that the first electrode active material layer and the second electrode active material layer are disposed so as to face each other with the solid electrolyte layer interposed therebetween, short-circuiting between the first electrode piece and the second electrode can be prevented.

More specifically, in the solid state battery of the present invention, since the first electrode piece is accommodated in the bag-shaped solid electrolyte layer, short-circuiting hardly occurs even when burrs generated when forming the first electrode piece and/or the second electrode exist on an end surface of the first electrode piece and/or the second electrode. Further, short-circuiting between the first electrode piece and the second electrode hardly occurs even when the first electrode active material layer and/or the second electrode active material layer is cracked or chipped when and/or after manufacturing the solid state battery.

DETAILED DESCRIPTION OF THE INVENTION

Figure 1A:
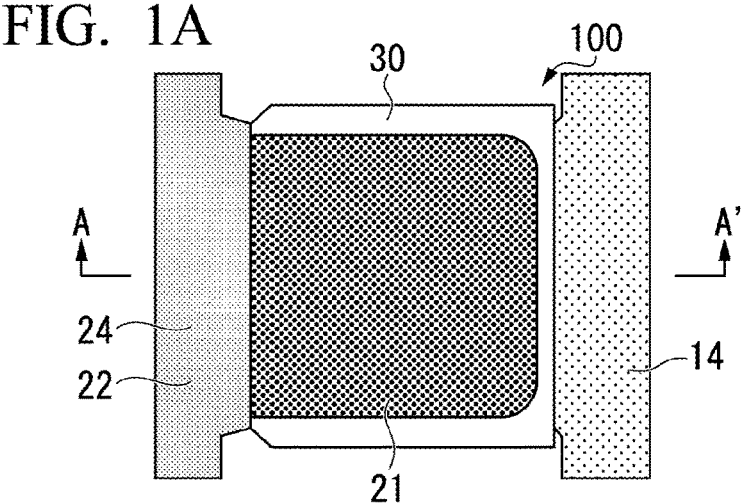
FIG. 1A is a plan view showing a solid state battery of a first embodiment of the present invention.

Hereinafter, a solid state battery and a solid state battery manufacturing method of the present invention will be described in detail with reference to the drawings. In the drawings used in the following description, a characteristic portion may be enlarged for convenience of description in order to easily understand the characteristic of the present invention. For this reason, the dimensional ratio of each component may be different from the actual one. Further, the materials, dimensions, and the like exemplified in the following description are examples. Thus, the present invention is not limited only to the embodiments described below and can be implemented with appropriate changes without changing the requirements of the present invention.

First Embodiment

Figure 1B:
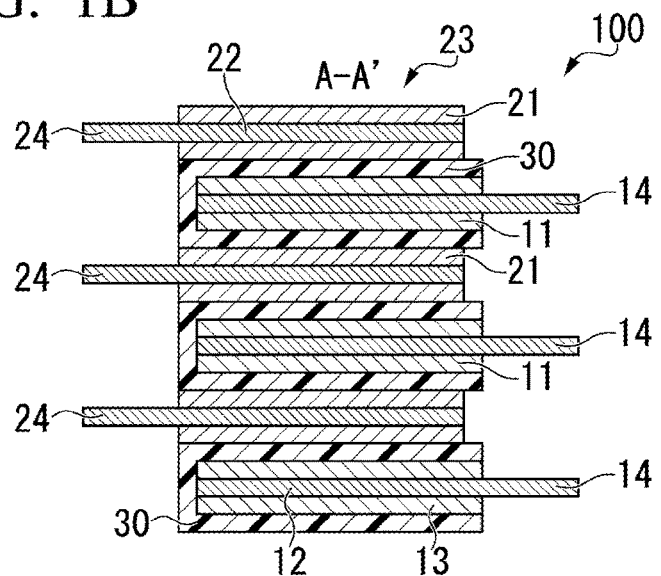
FIG. 1B is a cross-sectional view taken along a line A-A' of the solid state battery shown in FIG. 1A.
Figure 1C:
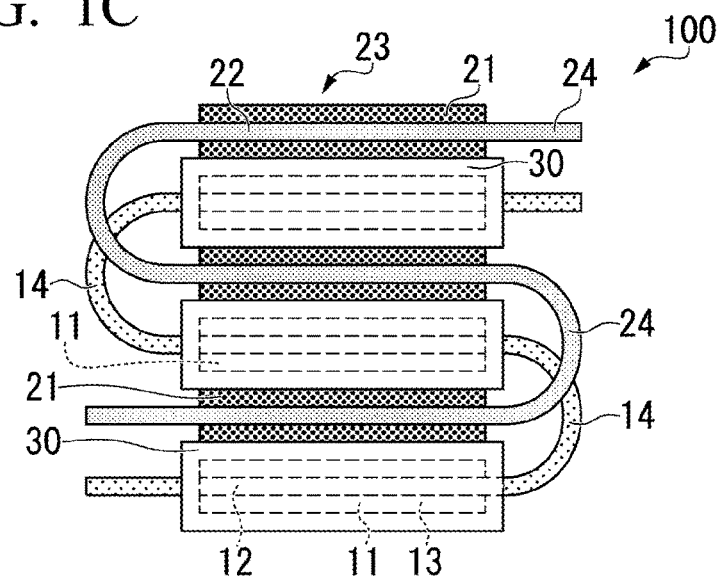
FIG. 1C is a side view when viewed from the left side in FIG. 1A.

FIG. 1A is a plan view showing a solid state battery of a first embodiment of the present invention. FIG. 1B is a cross-sectional view taken along a line A-A' of the solid state battery shown in FIG. 1A. FIG. 1C is a side view when viewed from the left side in FIG. 1A.

As shown in FIGS. 1A to 1C, a solid state battery 100 of this embodiment includes a positive electrode piece 13 (corresponding to a "first electrode piece" of claims), a negative electrode piece 23 (corresponding to a "second electrode piece" of claims), and a bag-shaped solid electrolyte layer 30 accommodating the positive electrode piece 13.

The solid state battery 100 of this embodiment is a solid-state lithium-ion secondary battery. In the solid state battery 100 of this embodiment, charging and discharging are performed by transferring lithium ions through a solid electrolyte layer between a positive electrode active material layer 11 of the positive electrode piece 13 and a negative electrode active material layer 21 of the negative electrode piece 23.

As shown in FIGS. 1A to 1C, the solid state battery 100 of this embodiment has a laminated body and a protection layer (not shown) may be laminated on the uppermost layer and/or the lowermost layer. Further, the solid state battery 100 of this embodiment is preferably accommodated in a sealed state by an exterior material (not shown) formed of a film or the like.

As shown in FIGS. 1A to 1C, in the positive electrode piece 13, the positive electrode active material layer 11 (corresponding to a "first electrode active material layer" of claims) is formed on a positive electrode current collector layer 12 (corresponding to a "first current collector layer" of claims). In the solid state battery 100 of this embodiment, as shown in FIGS. 1B and 1C, one in which the positive electrode active material layer 11 is formed on both surfaces of the positive electrode current collector layer 12 is used as the positive electrode piece 13.

The positive electrode current collector layer 12 may be one having conductivity and is preferably formed of a material having high conductivity. As the highly conductive material used in the positive electrode current collector layer 12, for example, metals such as silver (Ag), palladium (Pd), gold (Au), platinum (Pt), aluminum (Al), copper (Cu), titanium (Ti), and nickel (Ni), alloys such as stainless steel (SUS) and aluminum alloy, and non-metals such as carbon (C) may be exemplified. Among these highly conductive materials, it is preferable to use aluminum, nickel, or stainless steel in consideration of the manufacturing cost in addition to the high conductivity.

In particular, aluminum does not easily react with a positive electrode active material and a solid electrolyte. For that reason, when aluminum is used as the material of the positive electrode current collector layer 12, the internal resistance of the solid state battery 100 can be preferably reduced.

As the shape of the positive electrode current collector layer 12, for example, a plate shape, a foil shape, and a porous shape (sponge shape) are exemplary examples.

As the positive electrode current collector layer 12, a carbon layer or the like may be disposed on the surface or the surface may be roughened in order to increase the adhesion to the positive electrode active material layer 11.

The positive electrode active material layer 11 contains a positive electrode active material that exchanges lithium ions and electrons. As the positive electrode active material, a known positive electrode active material applicable as the positive electrode active material of the solid-state lithium-ion secondary battery can be used and a material which can reversibly release and occlude lithium ions and can transport electrons is preferably used. Specifically, as the positive electrode active material, composite oxides such as lithium cobalt oxide ($LiCoO_2$), lithium nickel oxide ($LiNiO_2$), lithium manganese oxide ($LiMn_2O_4$), solid solution oxide ($Li_2MnO_3$—$LiMO_2$ (M=Co, Ni, or the like)), lithium-manganese-nickel-cobalt oxide ($LiNi_{1/3}Mn_{1/3}Co_{1/3}O_2$), and olivine type lithium phosphate ($LiFePO_4$); conductive polymers such as polyaniline and polypyrrole; sulfides such as $Li_2S$, CuS, Li—Cu—S compounds, $TiS_2$, FeS, $MoS_2$, and Li—Mo—S compounds; a mixture of sulfur and carbon; and the like are exemplary examples. The positive electrode active material may use one of the above-described materials alone or two or more of them in combination.

The positive electrode active material layer 11 contains a solid electrolyte that exchanges lithium ions with the positive electrode active material. The solid electrolyte contained in the positive electrode active material layer 11 is not particularly limited as long as the solid electrolyte has lithium ion conductivity and generally, the solid electrolyte material used in the solid-state lithium-ion secondary battery can be used.

As the solid electrolyte, for example, inorganic solid electrolytes such as sulfide solid electrolyte, oxide solid electrolyte, and lithium-containing salt, polymer-based solid electrolytes such as polyethylene oxide, and gel-based solid electrolytes containing lithium-containing salts and lithium-ion conductive ionic liquids are exemplary examples. The solid electrolyte contained in the positive electrode active material layer 11 may use one of the above-described materials alone or two or more of them in combination.

The solid electrolyte contained in the positive electrode active material layer 11 may be the same as or different from the solid electrolyte contained in the negative electrode active material layer 21 and/or the solid electrolyte layer 30.

The positive electrode active material layer 11 may contain a conductive additive to improve conductivity. As the conductive additive, a known conductive additive that can be used for a solid-state lithium-ion secondary battery can be used. Specifically, examples of the conductive additive include carbon materials such as carbon black such as acetylene black and Ketjen black; carbon fiber; vapor-grown carbon fiber; graphite powder; and carbon nanotube. The conductive additive may use one of the above-described materials alone or two or more of them in combination.

Further, the positive electrode active material layer 11 may contain a binder having a role of binding the positive electrode active materials to each other and binding the positive electrode active material and the positive electrode current collector layer 12 to each other. As the binder, a known binder which can be used in the solid-state lithium-ion secondary battery can be used.

As shown in FIGS. 1A to 1C, in the negative electrode piece 23, the negative electrode active material layer 21 (corresponding to a "second electrode active material layer" of claims) is formed on a negative electrode current collector layer 22 (corresponding to a "second current collector layer" of claims). In the solid state battery 100 of this embodiment, as shown in FIGS. 1C and 1C, one in which the negative electrode active material layer 21 is formed on both surfaces of the negative electrode current collector layer 22 is used as the negative electrode piece 23.

The negative electrode current collector layer 22 may be one having conductivity and is preferably formed of a material having high conductivity. As the highly conductive material used in the negative electrode current collector layer 22, for example, metals such as silver (Ag), palladium (Pd), gold (Au), platinum (Pt), aluminum (Al), copper (Cu), titanium (Ti), and nickel (Ni), alloys such as stainless steel (SUS), copper alloy, and aluminum alloy, or non-metals such as carbon (C) are exemplary examples. Among these highly conductive materials, it is preferable to use copper, stainless steel, or nickel in consideration of the manufacturing cost in addition to the high conductivity. Particularly, stainless steel hardly reacts with the negative electrode active material and the solid electrolyte. For that reason, when stainless steel is used as the material of the negative electrode current collector layer 22, the internal resistance of the solid state battery 100 can be preferably reduced.

As the shape of the negative electrode current collector layer 22, for example, a plate shape, a foil shape, and a porous shape (sponge shape) are exemplary examples.

As the negative electrode current collector layer 22, a carbon layer or the like may be disposed on the surface or the surface may be roughened in order to increase the adhesion to the negative electrode active material layer 21.

The negative electrode active material layer 21 contains a negative electrode active material that exchanges lithium ions and electrons. As the negative electrode active material, a known negative electrode active material applicable as the negative electrode active material of the solid-state lithium-ion secondary battery can be used and a material which can reversibly release and occlude lithium ions and can transport electrons is preferably used. Specifically, as the negative electrode active material, carbonaceous materials such as natural graphite, artificial graphite, resin charcoal, carbon fiber, activated carbon, hard carbon, and soft carbon; alloy materials mainly composed of tin, tin alloy, silicon, silicon alloy, gallium, gallium alloy, indium, indium alloy, aluminum, aluminum alloy, or the like; conductive polymers such as polyacene, polyacetylene, and polypyrrole; metal lithium; lithium titanium composite oxide (for example, $Li_4Ti_5O_{12}$); and the like are exemplary examples. The negative electrode active material may use one of the above-described materials alone or two or more of them in combination.

When metal lithium or an alloy-based material is used as the negative electrode active material layer 21, the negative electrode active material layer 21 may be used as the negative electrode current collector layer 22. In that case, the negative electrode current collector may or may not be used. That is, the negative electrode active material layer 21 may also serve as the negative electrode current collector layer 22.

The negative electrode active material layer 21 contains a solid electrolyte that exchanges lithium ions with the negative electrode active material. The solid electrolyte contained in the negative electrode active material layer 21 is not particularly limited as long as the solid electrolyte has lithium ion conductivity and generally, the solid electrolyte material used in the solid-state lithium-ion secondary battery can be used. As the solid electrolyte, for example, inorganic solid electrolytes such as sulfide solid electrolyte, oxide solid electrolyte, and lithium-containing salt, polymer-based solid electrolytes such as polyethylene oxide, lithium-containing salts, and gel-based solid electrolytes containing lithium-ion conductive ionic liquids may be exemplified. The solid electrolyte contained in the negative electrode active material layer 21 may use one of the above-described materials alone or two or more of them in combination.

The solid electrolyte contained in the negative electrode active material layer 21 may be the same as or different from the solid electrolyte contained in the positive electrode active material layer 11 and/or the solid electrolyte layer 30.

The negative electrode active material layer 21 may contain a conductive additive to improve conductivity. As the conductive additive, for example, the same material as the material used in the positive electrode active material layer 11 can be used.

The negative electrode active material layer 21 may contain a binder having a role of binding the negative electrode active materials to each other and binding the negative electrode active material and the negative electrode active material layer 21 to each other. As the binder, for example, the same material as the material used in the positive electrode active material layer 11 can be used.

The bag-shaped solid electrolyte layer 30 has a configuration in which a solid electrolyte layer sheet having a porous base material and a solid electrolyte held by the porous base material is formed in a bag shape.

The form of the porous base material forming the solid electrolyte layer sheet is not particularly limited, and examples thereof include a woven fabric, a nonwoven fabric, a mesh cloth, a porous membrane, an expanded sheet, and a punching sheet. Among these forms, a nonwoven fabric is preferable from the viewpoint of the holding force and the handleability of the solid electrolyte.

The porous base material is preferably formed of an insulating material. Accordingly, a solid electrolyte layer sheet with good insulation properties is provided.

As the insulating material, for example, resin materials such as nylon, polyester, polyethylene, polypropylene, polytetrafluoroethylene, ethylene-tetrafluoroethylene copolymer, polyvinylidene fluoride, polyvinylidene chloride, polyvinyl chloride, polyurethane, vinylon, polybenzimidazole, polyimide, polyphenylene sulfide, polyetheretherketone, cellulose, and acrylic resin; natural fibers such as hemp, wood pulp, and cotton linter, and glass are exemplary examples.

As the solid electrolyte of the solid electrolyte layer sheet, one having lithium ion conductivity and insulation properties may be used and a known solid electrolyte applicable as the solid electrolyte of the solid-state lithium-ion secondary battery can be used. Specifically, as the solid electrolyte, inorganic solid electrolytes such as sulfide solid electrolyte, oxide solid electrolyte, and lithium-containing salt, polymer-based solid electrolytes such as polyethylene oxide, lithium-containing salts, and gel-based solid electrolytes containing lithium-ion conductive ionic liquids are exemplary examples.

The form of the solid electrolyte is not particularly limited and examples thereof include a particulate form.

The solid electrolyte layer sheet used in the bag-shaped solid electrolyte layer 30 may contain an adhesive in order to provide mechanical strength and/or flexibility.

Known adhesives can be used as the adhesive.

As the solid electrolyte layer sheet used in the bag-shaped solid electrolyte layer 30, one without the porous base material may be used. As such a solid electrolyte layer sheet, for example, one composed of a solid electrolyte and a binder is an exemplary example. As the binder, for example, the same material as the material used in the positive electrode active material layer 11 can be used.

In the solid state battery 100 of this embodiment, as shown in FIGS. 1A to 1C, the positive electrode piece 13 accommodated in the bag-shaped solid electrolyte layer 30 and the negative electrode piece 23 are alternately laminated in a plurality of layers (in this embodiment, three layers for each of them) so as to overlap each other in a plan view so that the positive electrode active material layer 11 and the negative electrode active material layer 21 are disposed so as to face each other with the solid electrolyte layer interposed therebetween.

The number of times of laminating each of the positive electrode pieces 13 accommodated in the bag-shaped solid electrolyte layer 30 and the negative electrode pieces 23 is one or more. Here, the number can be appropriately determined in response to the application or the like of the solid state battery 100 and is not particularly limited.

Figure 2:
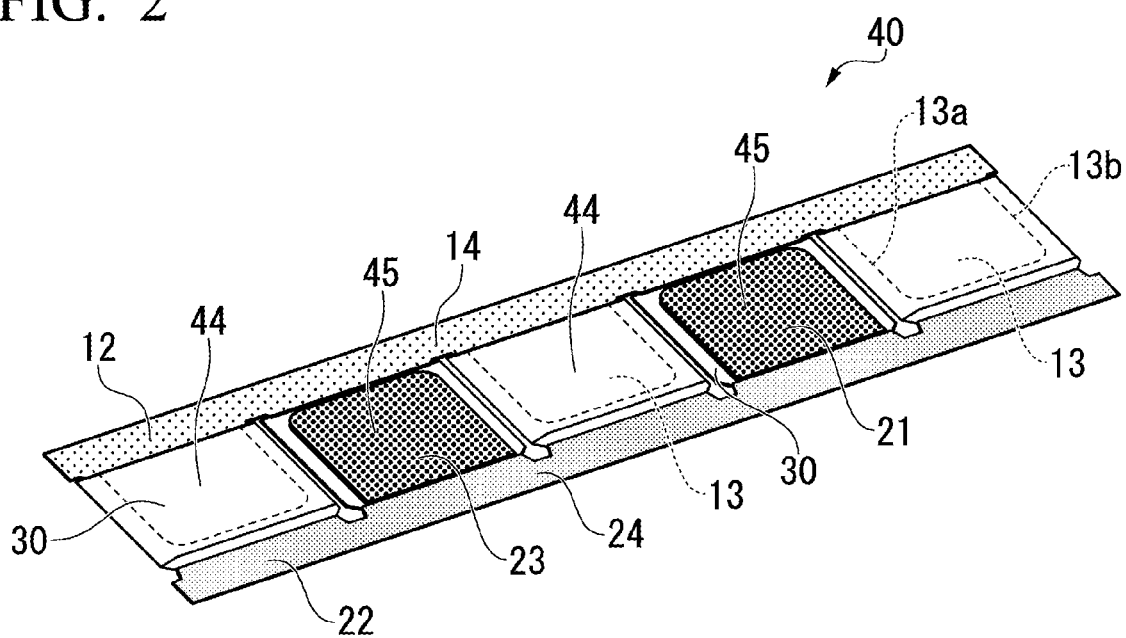
FIG. 2 is an explanatory diagram showing an electrode sheet of the solid state battery of the first embodiment.

FIG. 2 is an explanatory diagram showing an electrode sheet 40 of the solid state battery 100 of the first embodiment. The solid state battery 100 of this embodiment has a laminated structure in which the electrode sheet 40 shown in FIG. 2 is folded in a bellows shape (wound shape). For this reason, the solid state battery 100 of this embodiment is preferable because the relative displacement between the positive electrode piece 13 and the negative electrode piece 23 in a plan view hardly occurs.

As shown in FIG. 2, the electrode sheet 40 includes a positive electrode connection portion 14 (corresponding to a "first connection portion" of claims) which is formed by the positive electrode current collector layer 12 and extends in a belt shape and the plurality of positive electrode pieces 13 which are connected to a side surface of the positive electrode connection portion 14 and are respectively accommodated in the bag-shaped solid electrolyte layer 30. The positive electrode connection portion 14 is a region in which the positive electrode active material layer 11 on the positive electrode current collector layer 12 is not formed. The positive electrode connection portion 14 functions as a positive electrode drawn electrode and is electrically connected to an external electrode (not shown).

Further, as shown in FIG. 2, the electrode sheet 40 includes a negative electrode connection portion 24 (corresponding to a "second connection portion" of claims) which is formed by the negative electrode current collector layer 22 and extends in a belt shape and the plurality of negative electrode pieces 23 which are connected to a side surface of the negative electrode connection portion 24. The negative electrode connection portion 24 is a region in which the negative electrode active material layer 21 on the negative electrode current collector layer 22 is not formed. The negative electrode connection portion 24 functions as a negative electrode drawn electrode and is electrically connected to an external electrode (not shown).

In the electrode sheet 40, as shown in FIG. 2, the positive electrode connection portion 14 and the negative electrode connection portion 24 are disposed to face each other in a plan view on the longitudinal side surface. Further, as shown in FIG. 2, a first region 45 and a second region 44 are alternately formed between the positive electrode connection portion 14 and the negative electrode connection portion 24 in the longitudinal direction, the first region 45 being formed such that the bag-shaped solid electrolyte layer 30 accommodating the positive electrode piece 13 and the negative electrode piece 23 are laminated and the second region 44 being formed such that the bag-shaped solid electrolyte layer 30 and the negative electrode piece 23 are laminated in a laminating order opposite to that of the first region. In the first region 45 of the electrode sheet 40 shown in FIG. 2, the negative electrode piece 23 is laminated on the bag-shaped solid electrolyte layer 30. In the second region 44 shown in FIG. 2, the bag-shaped solid electrolyte layer 30 is laminated on the negative electrode piece 23.

In the solid state battery 100 of this embodiment, the electrode sheet 40 shown in FIG. 2 is folded in a bellows shape so that the first region 45 and the second region 44 are alternately laminated.

In the electrode sheet 40, as shown in FIG. 2, a gap between the first region 45 and the second region 44 is constant and the first region 45 and the second region 44 are disposed at a constant pitch. A gap between the first region 45 and the second region 44 is determined by a dimension between the adjacent positive electrode pieces 13, a dimension between the adjacent negative electrode pieces 23, and a longitudinal dimension of the electrode sheet 40 of the bag-shaped solid electrolyte layer 30.

As shown in FIG. 2, the positive electrode piece 13 of the electrode sheet 40 has a substantially rectangular shape in a plan view and a corner portion disposed on the side opposite to the positive electrode connection portion 14 is chamfered as a curved surface. Accordingly, the positive electrode active material layer 11 of the positive electrode piece 13 is prevented from being cracked or chipped.

Further, as shown in FIGS. 1A and 2, the negative electrode piece 23 of the electrode sheet 40 has a substantially rectangular shape in a plan view and a corner portion disposed on the side opposite to the negative electrode connection portion 24 is chamfered as a curved surface. Accordingly, the negative electrode active material layer 21 of the negative electrode piece 23 is prevented from being cracked or chipped.

The bag-shaped solid electrolyte layer 30 of the solid state battery 100 of this embodiment is formed by a solid electrolyte layer sheet. As shown in FIG. 2, the bag-shaped solid electrolyte layer 30 is formed in a bag shape such that the solid electrolyte layer sheet disposed so as to cover both surfaces (upper and lower surfaces) of the positive electrode piece 13 having a rectangular shape in a plan view is closed along end surfaces 13a and 13b of the positive electrode piece 13 in a direction orthogonal to the longitudinal direction of the positive electrode connection portion 14. Such a bag-shaped solid electrolyte layer 30 is preferable because the bag-shaped solid electrolyte layer can be easily and efficiently formed.

In the bag-shaped solid electrolyte layer 30 shown in FIG. 2, an edge portion of the positive electrode connection portion 14 in a direction orthogonal to the longitudinal direction is closed. An edge portion on the side opposite to the positive electrode connection portion 14 in the bag-shaped solid electrolyte layer 30 may be opened or closed.

When an edge portion on the side opposite to the positive electrode connection portion 14 in the bag-shaped solid electrolyte layer 30 is closed, it is preferable in that the generated pieces hardly leak from the bag-shaped solid electrolyte layer 30 even when the positive electrode active material layer 11 of the positive electrode piece 13 is cracked or chipped.

When an edge portion on the side opposite to the positive electrode connection portion 14 in the bag-shaped solid electrolyte layer 30 is closed, for example, the edge portion on the side opposite to the positive electrode connection portion 14 may be closed by connecting the solid electrolyte layer sheet disposed on the first surface (for example, the upper surface in FIG. 2) of the positive electrode piece 13 and the solid electrolyte layer sheet disposed on the second surface (for example, the lower surface in FIG. 2) of the positive electrode piece 13 along the end surface of the positive electrode piece 13 or may be closed by continuously forming the second surface of the positive electrode piece 13 by the solid electrolyte layer sheet forming the first surface of the positive electrode piece 13.

Solid State Battery Manufacturing Method

Next, a method of manufacturing the solid state battery 100 of this embodiment shown in FIGS. 1A to 1C will be described as an example of a solid state battery manufacturing method of the present invention.

Figure 3:
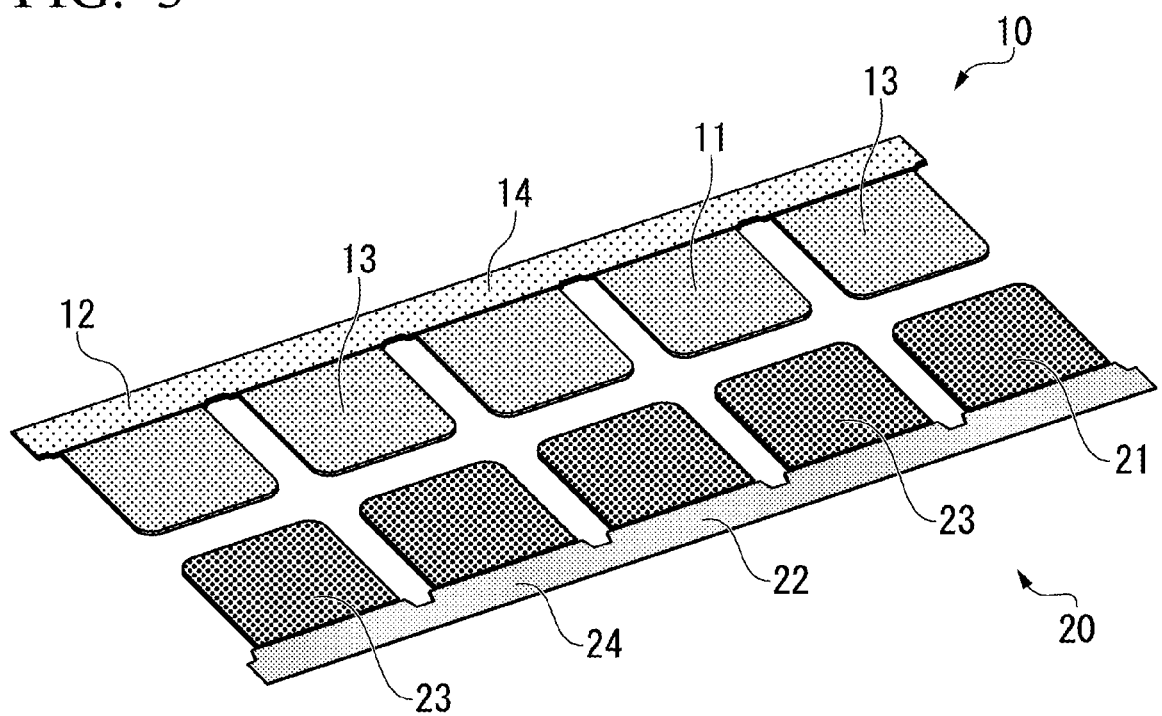
FIG. 3 is a plan view showing an example of a positive electrode sheet and a negative electrode sheet used in a method of manufacturing the solid state battery of the first embodiment.
Figure 4:
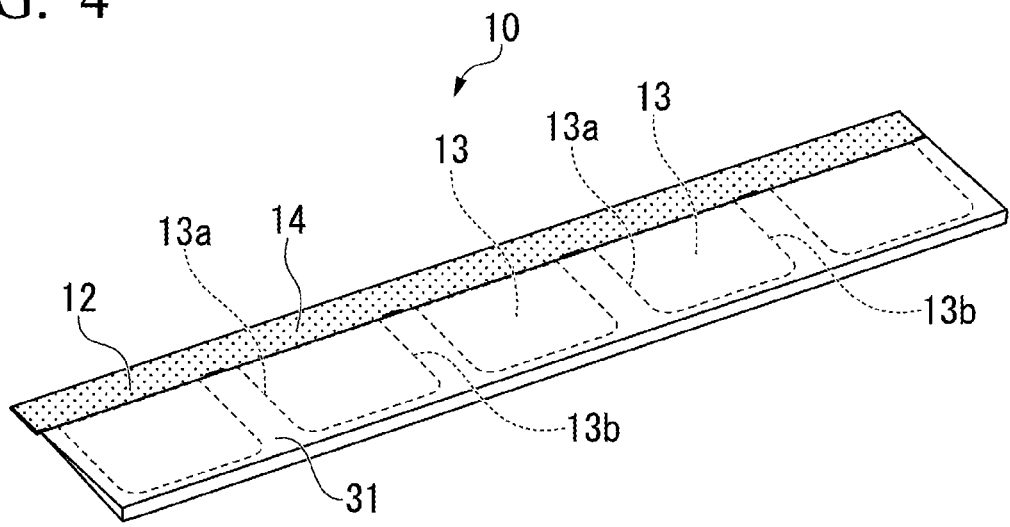
FIG. 4 is an explanatory diagram showing an example of the method of manufacturing the solid state battery of the first embodiment.
Figure 5:
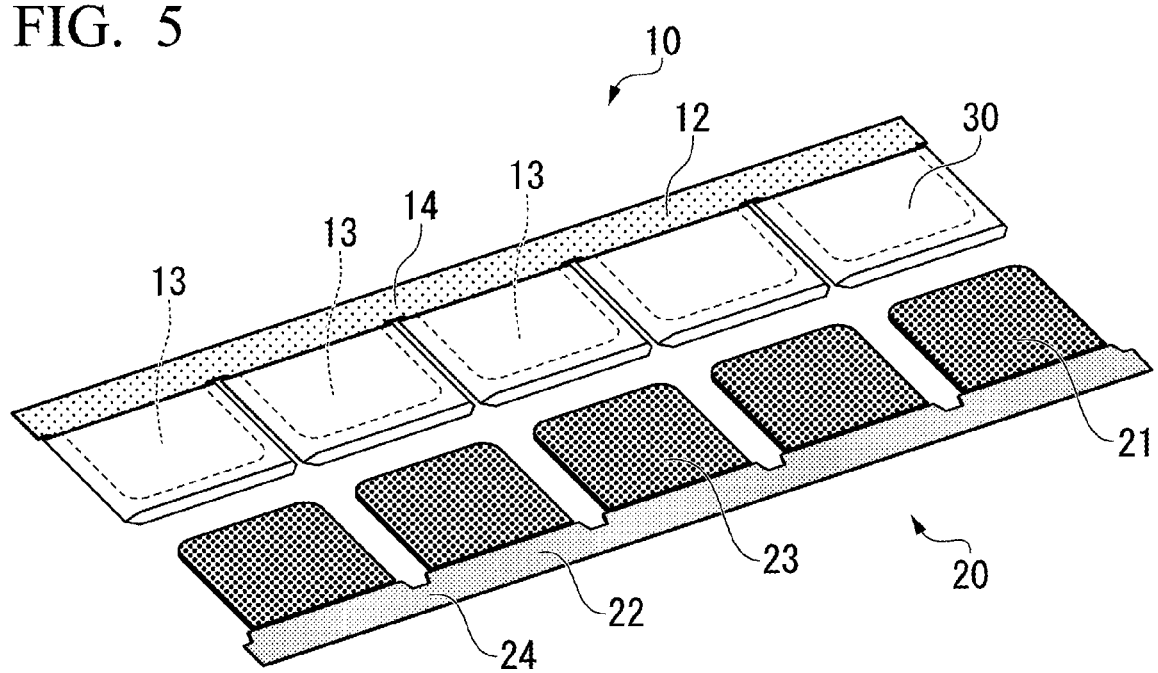
FIG. 5 is an explanatory diagram showing an example of the method of manufacturing the solid state battery of the first embodiment.
Figure 6:
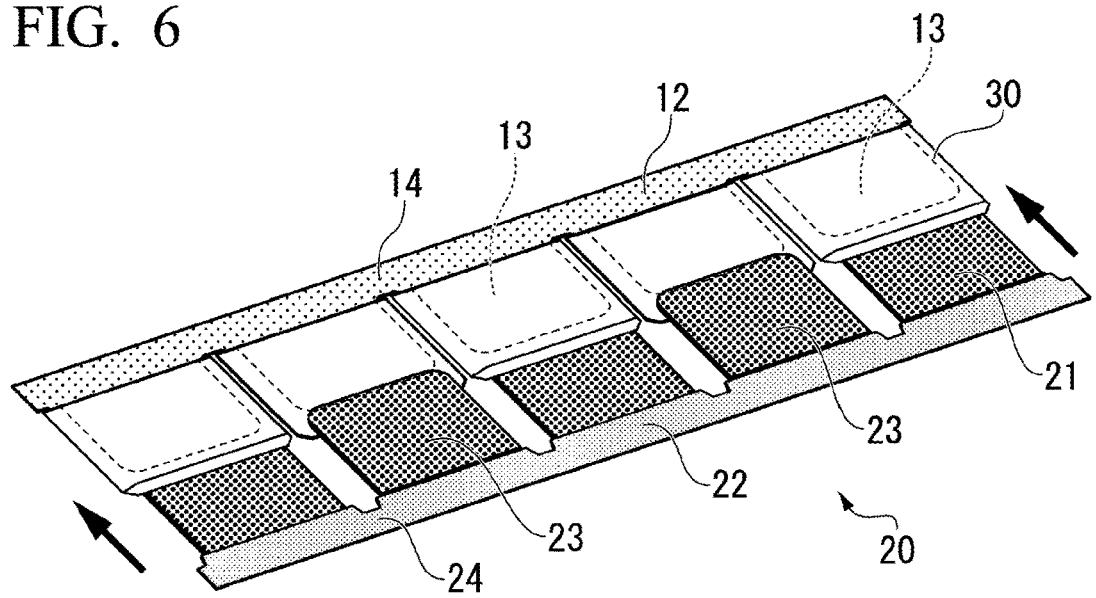
FIG. 6 is an explanatory diagram showing an example of the method of manufacturing the solid state battery of the first embodiment.

FIG. 3 is a plan view showing an example of a positive electrode sheet and a negative electrode sheet used in the method of manufacturing the solid state battery 100 of the first embodiment. FIGS. 4 to 6 are explanatory diagrams showing an example of a method of manufacturing the solid state battery 100 of the first embodiment.

Manufacturing of Positive Electrode Sheet 10

In the method of manufacturing the solid state battery 100 of this embodiment, first, a positive electrode sheet 10 (corresponding to a "first sheet" of claims) shown in FIG. 3 is manufactured.

Specifically, a positive electrode mixture is prepared by mixing, for example, a positive electrode active material, a solid electrolyte, a conductive additive, and a binder. Next, a positive electrode mixture slurry is prepared by dispersing the positive electrode mixture in a predetermined solvent. Next, the positive electrode mixture slurry is applied to a predetermined position of both surfaces of a positive electrode current collector, the solvent in the positive electrode mixture slurry is removed, and a resultant is compressed by a roll pressing machine or the like. Accordingly, a positive electrode active material layer is formed on both surfaces of the positive electrode current collector. Then, the comb-shaped positive electrode sheet 10 shown in FIG. 3 including the positive electrode connection portion 14 which is formed by the positive electrode current collector layer 12 and extends in a belt shape and the plurality of positive electrode pieces 13 which are connected to the side surface of the positive electrode connection portion 14, have the positive electrode active material layer 11 formed on the positive electrode current collector layer 12, and have a rectangular shape in a plan view can be obtained by punching the positive electrode current collector having the positive electrode active material layer formed on both surfaces thereof.

Manufacturing of Negative Electrode Sheet 20

Next, in the method of manufacturing the solid state battery 100 of this embodiment, a negative electrode sheet 20 shown in FIG. 3 is manufactured.

Specifically, a negative electrode mixture is prepared by mixing, for example, a negative electrode active material, a solid electrolyte, and a binder. Next, a negative electrode mixture slurry is prepared by dispersing the negative electrode mixture in a predetermined solvent. Next, the negative electrode mixture slurry is applied to a predetermined position of both surfaces of the negative electrode current collector, the solvent in the negative electrode mixture slurry is removed, and a resultant is compressed by a roll pressing machine or the like. Accordingly, a negative electrode active material layer is formed on both surfaces of the negative electrode current collector. Then, the negative electrode sheet 20 shown in FIG. 3 including the negative electrode connection portion 24 which is formed by the negative electrode current collector layer 22 and extends in a belt shape and the plurality of negative electrode pieces 23 which are connected to the side surface of the negative electrode connection portion 24 can be obtained by punching the negative electrode current collector having the negative electrode active material layer formed on both surfaces thereof.

As shown in FIG. 3, the positive electrode sheet 10 and the negative electrode sheet 20 used in the manufacturing method of this embodiment are formed in the same comb shape. For this reason, in the step of press-molding the bellows-folded electrode sheet 40 to be described later and pressing the bellows-folded electrode sheet in the laminating direction, an unpressed portion is unlikely to be generated and the bellows-folded electrode sheet 40 can be press-molded with a uniform surface pressure. As a result, since it is possible to prevent the cracking and/or chipping of the positive electrode piece 13 and the negative electrode piece 23 due to the process of press-molding the bellows-folded electrode sheet 40, it is possible to manufacture the solid state battery 100 with good yield. Further, the solid state battery 100 having good initial performance is obtained.

Manufacturing of Electrode Sheet 40

Next, in the method of manufacturing the solid state battery 100 of this embodiment, the electrode sheet 40 shown in FIG. 2 is manufactured.

First, the solid electrolyte layer sheet 31 used when forming the bag-shaped solid electrolyte layer 30 is prepared. Specifically, a solid electrolyte slurry is prepared by dispersing a solid electrolyte in a predetermined solvent. Then, the solid electrolyte slurry is applied to an entire porous base material, the solvent in the solid electrolyte slurry is removed, and a resultant is compressed by a roll pressing machine or the like. Accordingly, the solid electrolyte layer sheet 31 can be obtained.

Further, when a solid electrolyte layer sheet composed of a solid electrolyte and a binder is used as the solid electrolyte layer sheet 31, for example, the solid electrolyte layer sheet can be manufactured by the following method.

First, a solid electrolyte slurry is prepared by dispersing the solid electrolyte and the binder in a predetermined solvent.

Next, the solid electrolyte slurry is applied to a non-porous base sheet formed of polyethylene terephthalate (PET) or the like and the solvent is removed from the solid electrolyte slurry so as to form a coating film.

Then, if necessary, the coating film is densified by a method of rolling the base sheet having the coating film and is peeled from the base sheet. Accordingly, the solid electrolyte layer sheet 31 composed of the solid electrolyte and the binder can be obtained.

Next, the positive electrode connection portion 14 of the positive electrode sheet 10 shown in FIG. 3 is exposed so as to continuously cover the plurality of positive electrode pieces 13 and the solid electrolyte layer sheet 31 is disposed on both surfaces of the positive electrode piece 13 as shown in FIG. 4. The solid electrolyte layer sheet 31 shown in FIG. 4 is a single sheet and is disposed so as to be folded back along the edge portion on the side opposite to the positive electrode connection portion 14 in the positive electrode piece 13 of the positive electrode sheet 10. Further, the solid electrolyte layer sheet 31 may be two sheets which are respectively disposed on the first surface side (for example, the upper surface side in FIG. 4) and the second surface side (for example, the lower surface side in FIG. 4) of the positive electrode sheet 10.

Next, the solid electrolyte layer sheet 31 between the adjacent positive electrode pieces 13 is crimped along the end surfaces 13a and 13b of the positive electrode piece 13 in a direction orthogonal to the longitudinal direction of the positive electrode connection portion 14 in the positive electrode sheet 10 shown in FIG. 4.

When one solid electrolyte layer sheet which is disposed so as to be folded back along the edge portion on the side opposite to the positive electrode connection portion 14 in the positive electrode piece 13 is used as the solid electrolyte layer sheet 31, the edge portion in a direction orthogonal to the longitudinal direction of the positive electrode connection portion 14 in the bag-shaped solid electrolyte layer 30 and the edge portion on the side opposite to the positive electrode connection portion 14 are closed by the above-described crimping.

When two solid electrolyte layer sheets which are respectively disposed on the first surface side and the second surface side of the positive electrode sheet 10 are used as the solid electrolyte layer sheet 31, the edge portion in a direction orthogonal to the longitudinal direction of the positive electrode connection portion 14 in the bag-shaped solid electrolyte layer 30 is closed and the edge portion on the side opposite to the positive electrode connection portion 14 is opened by the above-described crimping.

Additionally, when two solid electrolyte layer sheets which are respectively disposed on the first surface side and the second surface side of the positive electrode sheet 10 are used as the solid electrolyte layer sheet 31, the solid electrolyte layer sheet 31 disposed on the edge portion on the side opposite to the positive electrode connection portion 14 in the bag-shaped solid electrolyte layer 30 may be crimped in the above-described welding. In this case, the edge portions in a direction orthogonal to the longitudinal direction of the positive electrode connection portion 14 in the bag-shaped solid electrolyte layer 30 and the edge portions on the side opposite to the positive electrode connection portion 14 are closed.

Then, the solid electrolyte layer sheet 31 between the adjacent positive electrode pieces 13 is cut by punching the solid electrolyte layer sheet 31 between the adjacent positive electrode pieces 13. Accordingly, as shown in FIG. 5, the bag-shaped solid electrolyte layer 30 accommodating each of the plurality of positive electrode pieces 13 is formed.

The bag-shaped solid electrolyte layer 30 may be formed by the following method.

That is, a solid electrolyte slurry obtained by dispersing a solid electrolyte and a binder in a predetermined solvent is applied to a region excluding the positive electrode connection portion 14 on both surfaces of the positive electrode sheet 10 shown in FIG. 3 and the solvent in the solid electrolyte slurry is removed so as to form a solid electrolyte film. Accordingly, the positive electrode connection portion 14 is exposed and the positive electrode piece 13 provided on both surfaces of the positive electrode sheet 10 is covered with the solid electrolyte film.

Then, if necessary, the solid electrolyte film is densified by a method of press-rolling the positive electrode sheet 10 covered with the solid electrolyte film. Next, the solid electrolyte film between the adjacent positive electrode pieces 13 is cut by punching an extra solid electrolyte film existing between the adjacent positive electrode pieces 13. Accordingly, as shown in FIG. 5, the bag-shaped solid electrolyte layer 30 accommodating each of the plurality of positive electrode pieces 13 is formed.

Next, for example, as shown in FIG. 5, the positive electrode sheet 10 in which the plurality of positive electrode pieces 13 are respectively accommodated in the bag-shaped solid electrolyte layer 30 and the negative electrode sheet 20 are disposed so as to face each other in a plan view while the positive electrode connection portion 14 of the positive electrode sheet 10 and the negative electrode connection portion 24 of the negative electrode sheet 20 face outward.

Next, as shown in FIG. 6, the positive electrode sheet 10 and the negative electrode sheet 20 are combined while alternately forming the first region 45 (see FIG. 2) in which the bag-shaped solid electrolyte layer 30 and the negative electrode piece 23 are laminated and the second region 44 (see FIG. 2) in which the bag-shaped solid electrolyte layer 30 and the negative electrode piece 23 are laminated in a laminating order opposite to that of the first region 45 in the longitudinal direction. Accordingly, the electrode sheet 40 shown in FIG. 2 is formed.

Next, the electrode sheet 40 shown in FIG. 2 is folded in a bellows shape so that the first region 45 and the second region 44 are alternately laminated and the positive electrode piece 13 accommodated in the bag-shaped solid electrolyte layer 30 and the negative electrode piece 23 are laminated so as to overlap each other in a plan view. Then, the bellows-folded electrode sheet 40 is preferably pressed in the laminating direction by, for example, press-molding.

Subsequently, the positive electrode connection portion 14 is electrically connected to an external electrode (not shown). Further, the negative electrode connection portion 24 is electrically connected to an external electrode (not shown).

Then, if necessary, a protection layer (not shown) is formed on the uppermost layer and/or the lowermost layer of the bellows-folded electrode sheet 40 and is accommodated in an exterior material (not shown) such as a film in a sealed state.

With the above-described steps, the solid state battery 100 of this embodiment shown in FIGS. 1A to 1C can be obtained.

Since the solid state battery 100 of this embodiment includes the positive electrode piece 13 which has the positive electrode active material layer 11 formed on the positive electrode current collector layer 12 and the negative electrode piece 23 which has the negative electrode active material layer 21 formed on the negative electrode current collector layer 22 and the positive electrode piece 13 accommodated in the bag-shaped solid electrolyte layer 30 and the negative electrode piece 23 are laminated so as to overlap each other in a plan view so that the positive electrode active material layer 11 and the negative electrode active material layer 21 are disposed so as to face each other with the solid electrolyte layer interposed therebetween, short-circuiting between the positive electrode piece 13 and the negative electrode piece 23 can be prevented.

More specifically, in the solid state battery 100 of this embodiment, since the positive electrode piece 13 is accommodated in the bag-shaped solid electrolyte layer 30, short-circuiting hardly occurs even when burrs generated when forming the positive electrode piece 13 and/or the negative electrode piece 23 exist on the end surfaces of the positive electrode piece 13 and/or the negative electrode piece 23.

Further, short-circuiting between the positive electrode piece 13 and the negative electrode piece 23 hardly occurs even when the positive electrode active material layer 11 and/or the negative electrode active material layer 12 are cracked or chipped when and/or after manufacturing the solid state battery 100.

The method of manufacturing the solid state battery 100 of this embodiment includes: forming the positive electrode sheet 10 including the positive electrode connection portion 14 which is formed by the positive electrode current collector layer 12 and extends in a belt shape and the plurality of positive electrode pieces 13 which are connected to the side surface of the positive electrode connection portion 14, have the positive electrode active material layer 11 formed on the positive electrode current collector layer 12, and have a rectangular shape in a plan view; disposing the solid electrolyte layer sheet 31 on both surfaces of the positive electrode piece 13 so as to continuously cover the plurality of positive electrode pieces 13 by exposing the positive electrode connection portion 14; crimping the solid electrolyte layer sheet 31 between the adjacent positive electrode pieces 13 along the end surfaces 13*a* and 13*b* of the positive electrode piece 13 in a direction orthogonal to the longitudinal direction of the positive electrode sheet 10; and forming the bag-shaped solid electrolyte layer 30 accommodating each of the plurality of positive electrode pieces 13 by cutting the solid electrolyte layer sheet 31 between the adjacent positive electrode pieces 13. Thus, the solid state battery 100 of this embodiment can be easily and promptly manufactured as compared to, for example, a case in which the bag-shaped solid electrolyte layer 30 is formed by the solid electrolyte layer sheet 31 and the positive electrode piece 13 is covered with the bag-shaped solid electrolyte layer so as to form the positive electrode piece 13 accommodated in the bag-shaped solid electrolyte layer 30.

Second Embodiment

Figure 7A:
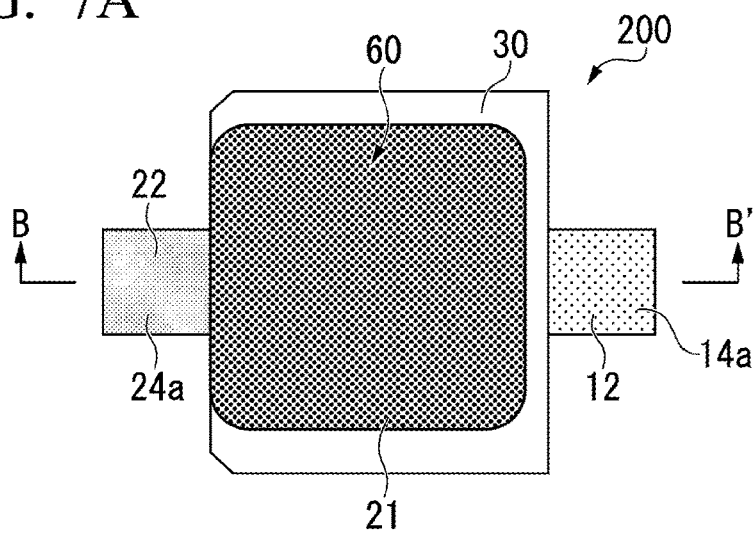
FIG. 7A is a plan view showing a solid state battery of a second embodiment of the present invention.
Figure 7B:
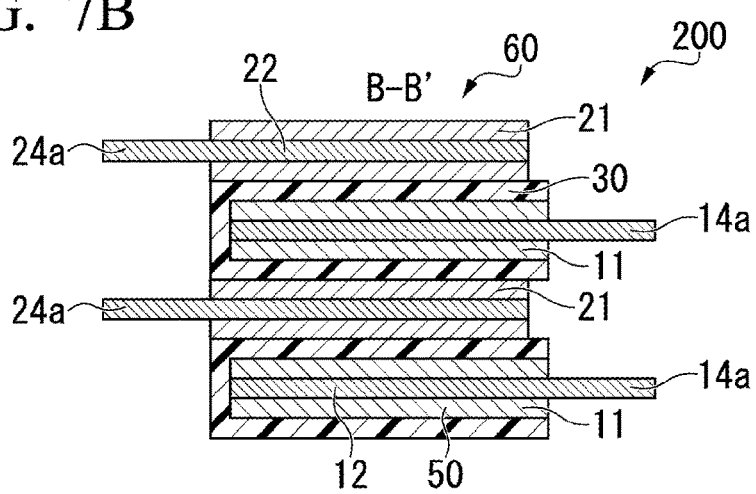
FIG. 7B is a cross-sectional view taken along a line B-B' of the solid state battery shown in FIG. 7A.

FIG. 7A is a plan view showing a solid state battery of a second embodiment of the present invention. FIG. 7B is a cross-sectional view taken along a line B-B' of the solid state battery shown in FIG. 7A.

As shown in FIGS. 7A and 7B, a solid state battery 200 of this embodiment includes a positive electrode piece 50 (corresponding to a "first electrode piece" of claims), a negative electrode piece 60 (corresponding to a "second electrode piece" of claims), and the bag-shaped solid electrolyte layer 30 accommodating the positive electrode piece 50.

The solid state battery 200 of this embodiment is a solid-state lithium-ion secondary battery similarly to the solid state battery 100 of the first embodiment. In the solid state battery 200 of this embodiment, charging and discharging are performed by transferring lithium ions through a solid electrolyte layer between the positive electrode active material layer 11 of the positive electrode piece 50 and the negative electrode active material layer 21 of the negative electrode piece 60.

The solid state battery 200 of the second embodiment shown in FIGS. 7A and 7B is different from the solid state battery 100 of the first embodiment shown in FIGS. 1A to 1C only in the shapes of the positive electrode current collector layer 12 (corresponding to a "first current collector layer" of claims) and the negative electrode current collector layer 22 (corresponding to a "second current collector layer" of claims).

Specifically, in the solid state battery 100 of the first embodiment, the positive electrode current collector layers 12 of the plurality of positive electrode pieces 13 are integrated by being connected at the positive electrode connection portion 14 on the right side surface in FIG. 1A. In contrast, in the solid state battery 200 of the second embodiment, as shown in FIG. 7B, the positive electrode current collector layer 12 may exist independently in each of the plurality of positive electrode pieces 50.

Further, in the solid state battery 100 of the first embodiment, the negative electrode current collector layers 22 of the plurality of negative electrode pieces 23 are integrated by being connected at the negative electrode connection portion 24 as shown in FIG. 1C on the left side surface in FIG. 1A. In contrast, in the solid state battery 200 of the second embodiment, as shown in FIG. 7B, the negative electrode current collector layer 22 may exist independently in each of the plurality of negative electrode pieces 60.

In the solid state battery 200 of the second embodiment shown in FIGS. 7A and 7B, the same reference numerals will be given to the same components as those of the solid state battery 100 of the first embodiment and a description thereof will be omitted.

Figure 8A:
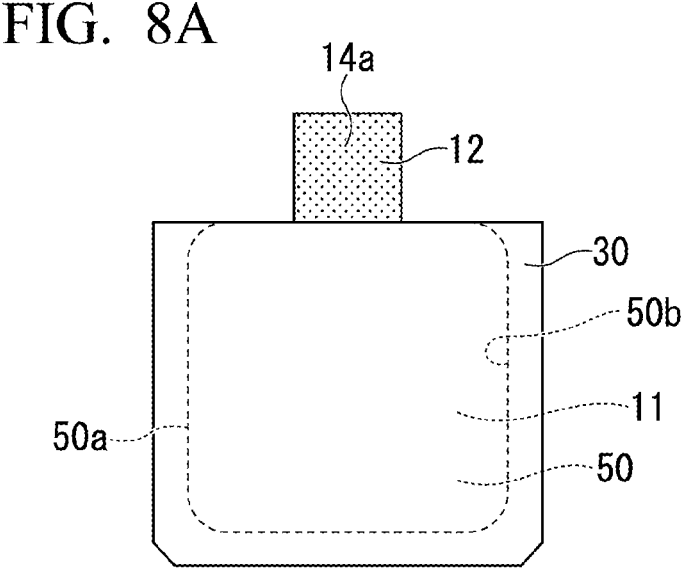
FIG. 8A is a plan view showing a positive electrode drawn electrode and a positive electrode piece accommodated in a bag-shaped solid electrolyte layer.
Figure 8B:
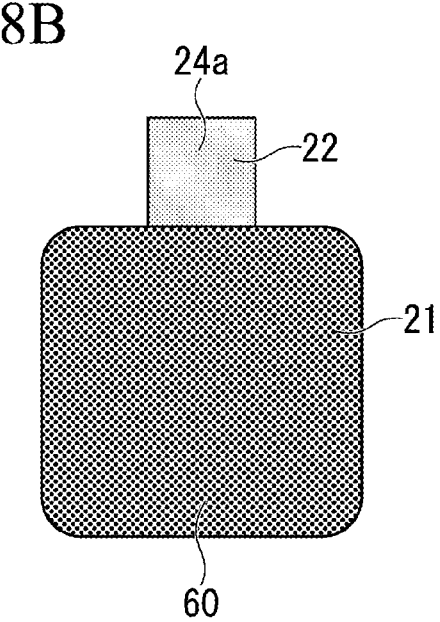
FIG. 8B is a plan view showing a negative electrode piece and a negative electrode drawn electrode.

FIGS. 8A and 8B are plan views showing a member of the solid state battery 200 of the second embodiment. FIG. 8A is a plan view showing the positive electrode piece 50 accommodated in the bag-shaped solid electrolyte layer 30 and a positive electrode drawn electrode 14*a* formed by a region in which the positive electrode active material layer 11 on the positive electrode current collector layer 12 is not laminated. FIG. 8B is a plan view showing the negative electrode piece 60 and a negative electrode drawn electrode 24*a* formed by a region in which the negative electrode active material layer 21 on the negative electrode current collector layer 22 is not formed.

A region without the positive electrode active material layer 11 on the positive electrode current collector layer 12 shown in FIGS. 7A, 7B, and 8A is the positive electrode drawn electrode 14*a* and is electrically connected to an external electrode (not shown).

Further, a region without the negative electrode active material layer 21 on the negative electrode current collector layer 22 shown in FIGS. 7A, 7B, and 8B is the negative electrode drawn electrode 24*a* and is electrically connected to an external electrode (not shown).

As shown in FIG. 8A, the positive electrode piece 50 has a substantially rectangular shape in a plan view and a corner portion disposed on the side opposite to the positive electrode drawn electrode 14*a* is chamfered as a curved surface. Accordingly, the positive electrode active material layer 11 of the positive electrode piece 50 is prevented from being cracked or chipped.

Further, as shown in FIG. 8B, the negative electrode piece 60 has a substantially rectangular shape in a plan view and a corner portion disposed on the side opposite to the negative electrode drawn electrode 24*a* is chamfered as a curved surface. Accordingly, the negative electrode active material layer 21 of the negative electrode piece 60 is prevented from being cracked or chipped.

In the solid state battery 200 of this embodiment, the positive electrode piece 50 accommodated in the bag-shaped solid electrolyte layer 30 shown in FIG. 8A and the negative electrode piece 60 shown in FIG. 8B are alternately laminated in a plurality of layers (in this embodiment, two layers for each of them) so as to overlap each other in a plan view so that the positive electrode active material layer 11 and the negative electrode active material layer 21 are disposed so as to face each other with the solid electrolyte layer interposed therebetween.

Solid State Battery Manufacturing Method

Next, a method of manufacturing the solid state battery 200 of this embodiment shown in FIGS. 7A and 7B will be described as an example.

Manufacturing of Positive Electrode Sheet

In the method of manufacturing the solid state battery 200 of this embodiment, first, the positive electrode sheet is manufactured.

Specifically, for example, similarly to the case of manufacturing the positive electrode sheet 10 used in the solid state battery 100 of the first embodiment, a positive electrode mixture slurry is prepared, the positive electrode mixture slurry is applied to a predetermined position of both surfaces of a positive electrode current collector, a solvent is removed, a resultant is compressed by a roll pressing machine or the like.

Accordingly, a positive electrode active material layer is formed on both surfaces of the positive electrode current collector. Then, the positive electrode sheet (see FIG. 8A) including the positive electrode piece 50 and the positive electrode drawn electrode 14*a* can be obtained by punching the positive electrode current collector having the positive electrode active material layer formed on both surfaces thereof.

Manufacturing of Negative Electrode Sheet

Next, in the method of manufacturing the solid state battery 200 of this embodiment, the negative electrode sheet is manufactured.

Specifically, for example, similarly to the case of manufacturing the negative electrode sheet 20 used in the solid state battery 100 of the first embodiment, a negative electrode mixture slurry is prepared, the negative electrode mixture slurry is applied to a predetermined position of both surfaces of a negative electrode current collector, a solvent is removed, and a resultant is pressed by a roll pressing machine or the like. Accordingly, a negative electrode active material layer is formed on both surfaces of the negative electrode current collector. Then, the negative electrode sheet (see FIG. 8B) including the negative electrode piece 60 and the negative electrode drawn electrode 24*a* can be obtained by punching the negative electrode current collector having the negative electrode active material layer formed on both surfaces thereof.

As shown in FIGS. 8A and 8B, the positive electrode piece 50 of the positive electrode sheet and the negative electrode piece 60 of the negative electrode sheet used in the manufacturing method of this embodiment have the same shape in a plan view.

For this reason, in the step of press-molding a laminated body to be described later and pressing the laminated body in the laminating direction, an unpressed portion is unlikely to be generated and the laminated body can be press-molded with a uniform surface pressure. As a result, since it is possible to prevent the cracking and/or chipping of the positive electrode piece 50 and the negative electrode piece 60 due to the process of press-molding the laminated body, it is possible to manufacture the solid state battery 200 with good yield. Further, the solid state battery 200 having good initial performance is obtained.

Next, similarly to the case of manufacturing the solid state battery 100 of the first embodiment, the solid electrolyte layer sheet is prepared.

Next, as shown in FIG. 8A, the solid electrolyte layer sheet is disposed on both surfaces of the positive electrode piece 50 so as to cover the positive electrode piece 50 by exposing the positive electrode drawn electrode 14*a*. The solid electrolyte layer sheets is a single sheet and is disposed so as to be folded back along the edge portion on the side opposite to the positive electrode drawn electrode 14*a* in the positive electrode piece 50. Further, the solid electrolyte layer sheet may be two sheets which are respectively disposed on the first surface side (for example, the upper surface side in FIG. 8A) and the second surface side (for example, the lower surface side in FIG. 8A) of the positive electrode piece 50.

Next, the solid electrolyte layer sheet is crimped along end surfaces 50*a* and 50*b* adjacent to the end surface provided with the positive electrode drawn electrode 14*a* in the positive electrode piece 50 shown in FIG. 8A.

When one solid electrolyte layer sheet which is disposed so as to be folded back along the edge portion of the positive electrode piece 50 on the side opposite to the positive electrode drawn electrode 14*a* is used as the solid electrolyte layer sheet, the edge portion on the side opposite to the positive electrode drawn electrode 14*a* in the bag-shaped solid electrolyte layer 30 and the edge portion adjacent to the edge portion are closed by the above-described crimping. Thus, only the edge portion on the side of the positive electrode drawn electrode 14*a* in the bag-shaped solid electrolyte layer 30 is opened.

When two solid electrolyte layer sheets which are respectively disposed on the first surface side and the second surface side of the positive electrode piece 50 are used as the solid electrolyte layer sheet, the edge portion adjacent to the edge portion on the side of the positive electrode drawn electrode 14*a* in the bag-shaped solid electrolyte layer 30 is closed and the edge portion on the side opposite to the positive electrode drawn electrode 14*a* is opened by the above-described crimping.

Additionally, when two solid electrolyte layer sheets which are respectively disposed on the first surface side and the second surface side of the positive electrode sheet 50 are used as the solid electrolyte layer sheet, the solid electrolyte layer sheet disposed on the edge portion on the side opposite to the positive electrode drawn electrode 14*a* in the bag-shaped solid electrolyte layer 30 may be crimped in the above-described crimping. In this case, the edge portion on the side opposite to the positive electrode drawn electrode 14*a* in the bag-shaped solid electrolyte layer 30 and the edge portion adjacent to the edge portion are closed.

Then, an extra solid electrolyte layer sheet 31 existing in the periphery of the bag-shaped solid electrolyte layer 30 is cut by a punching method or the like. Accordingly, as shown in FIG. 8A, the bag-shaped solid electrolyte layer 30 accommodating the positive electrode piece 50 is formed.

Next, the negative electrode sheet including the negative electrode piece 60 and the negative electrode drawn electrode 24*a* is laminated on the positive electrode sheet including the positive electrode piece 50 accommodated in the bag-shaped solid electrolyte layer 30 and the positive electrode drawn electrode 14*a* so that the positive electrode piece 50 and the negative electrode piece 60 overlap each other in a plan view, thereby forming a laminated body. Then, the laminated body is preferably pressed in the laminating direction by, for example, press-molding.

Subsequently, the positive electrode drawn electrode 14*a* and the negative electrode drawn electrode 24*a* of the laminated body are respectively electrically connected to an external electrode (not shown).

Then, if necessary, a protection layer (not shown) is formed on the uppermost layer and/or the lowermost layer of the laminated body and is accommodated in an exterior material (not shown) such as a film in a sealed state.

With the above-described steps, the solid state battery 200 of this embodiment shown in FIGS. 7A and 7B can be obtained.

Since the solid state battery 200 of this embodiment includes the positive electrode piece 50 which has the positive electrode active material layer 11 formed on the positive electrode current collector layer 12 and the negative electrode piece 60 which has the negative electrode active material layer 21 formed on the negative electrode current collector layer 22 and the positive electrode piece 50 accommodated in the bag-shaped solid electrolyte layer 30 and the negative electrode piece 60 are laminated so as to overlap each other in a plan view so that the positive electrode active material layer 11 and the negative electrode active material layer 21 are disposed so as to face each other with the solid electrolyte layer interposed therebetween, short-circuiting between the positive electrode piece 50 and the negative electrode piece 60 can be prevented.

More specifically, in the solid state battery 200 of this embodiment, since the positive electrode piece 50 is accommodated in the bag-shaped solid electrolyte layer 30, short-circuiting hardly occurs even when burrs generated when forming the positive electrode piece 50 and/or the negative electrode piece 60 exist on the end surfaces of the positive electrode piece 50 and/or the negative electrode piece 60.

Further, short-circuiting between the positive electrode piece 50 and the negative electrode piece 60 hardly occurs even when the positive electrode active material layer 11 and/or the negative electrode active material layer 12 are cracked or chipped when and/or after manufacturing the solid state battery 200.

Third Embodiment

Figure 9A:
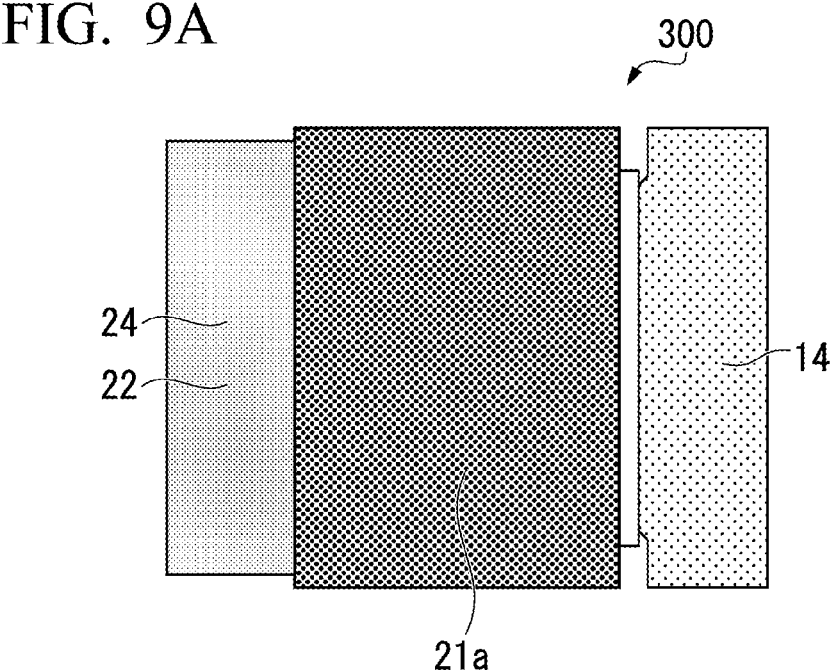
FIG. 9A is a plan view showing a solid state battery of a third embodiment of the present invention.
Figure 9B:
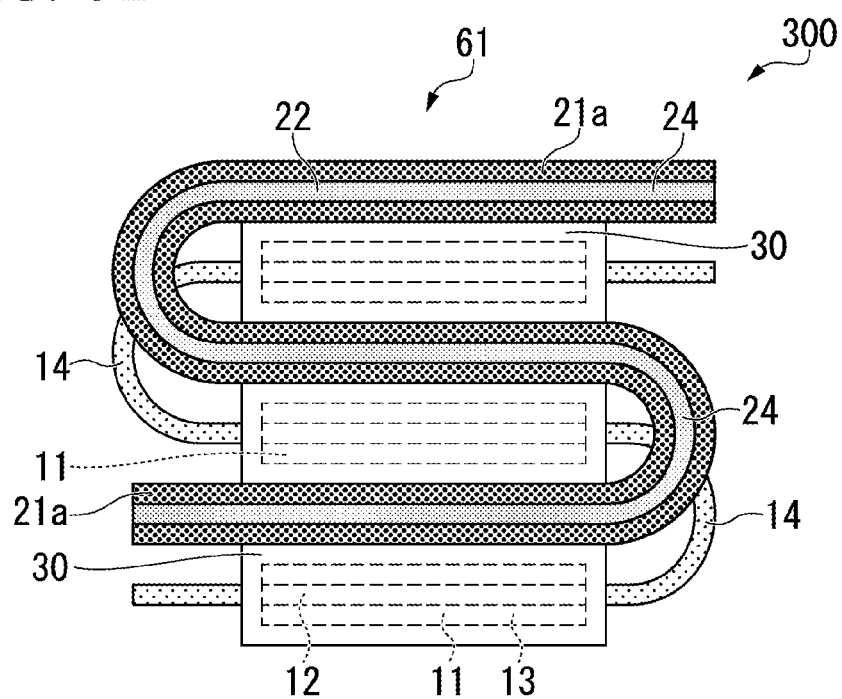
FIG. 9B is a side view when viewed from the left side in FIG. 9A.

FIG. 9A is a plan view showing a solid state battery of a third embodiment of the present invention. FIG. 9B is a side view when viewed from the left side of FIG. 9A.

As shown in FIG. 9B, a solid state battery 300 of this embodiment includes the positive electrode piece 13 (corresponding to a "first electrode piece" of claims), a negative electrode 61 (corresponding to a "second electrode" of claims), and the bag-shaped solid electrolyte layer 30 accommodating the positive electrode piece 13.

The solid state battery 300 of this embodiment is a solid-state lithium-ion secondary battery similarly to the solid state battery 100 of the first embodiment. In the solid state battery 300 of this embodiment, charging and discharging are performed by transferring lithium ions through the solid electrolyte layer between the positive electrode active material layer 11 of the positive electrode piece 13 and a negative electrode active material layer 21a of the negative electrode 61.

The solid state battery 300 of the third embodiment shown in FIGS. 9A and 9B is different from the solid state battery 100 of the first embodiment shown in FIGS. 1A to 1C only in the shape of the negative electrode 61 (corresponding to a "second electrode" of claims).

Specifically, in the solid state battery 100 of the first embodiment, the second electrode in which the second electrode active material layer is formed on the second current collector layer is formed by a plurality of second electrode pieces having the same shape as the first electrode piece.

In contrast, in the solid state battery 300 of the third embodiment, as shown in FIG. 9B, the second electrode (the negative electrode 61) has a belt shape in which the second electrode active material layer (the negative electrode active material layer 21a) is formed on the second current collector layer (the negative electrode current collector layer 22).

In the solid state battery 300 of the third embodiment shown in FIGS. 9A and 9B, the same reference numerals will be given to the same components as those of the solid state battery 100 of the first embodiment and a description thereof will be omitted.

Figure 10:
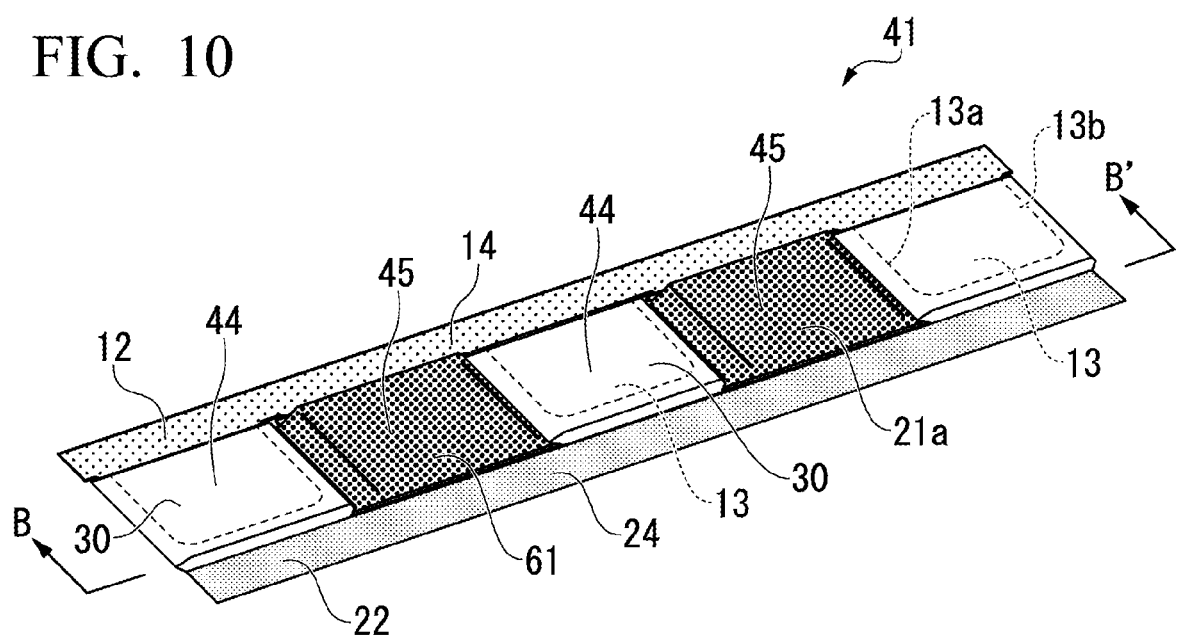
FIG. 10 is an explanatory diagram showing an electrode sheet of the solid state battery of the third embodiment.
Figure 11:
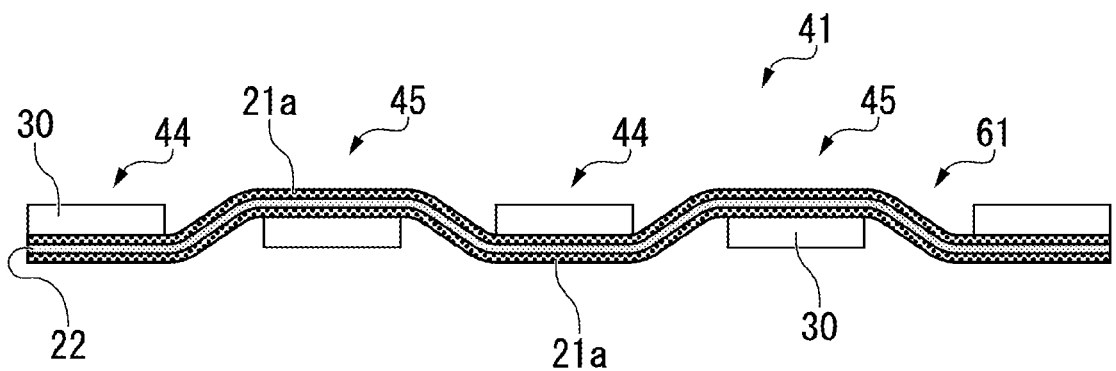
FIG. 11 is a cross-sectional view showing the electrode sheet of the solid state battery of the third embodiment.

FIG. 10 is an explanatory diagram showing an electrode sheet 41 of the solid state battery 300 of the third embodiment. FIG. 11 is a cross-sectional view of the electrode sheet 41 of the solid state battery 300 of the third embodiment.

The solid state battery 300 of this embodiment has a laminated structure in which the electrode sheet 41 shown in FIGS. 10 and 11 is folded in a bellows shape (wound shape).

The electrode sheet 41 includes the negative electrode 61 which extends in a belt shape as shown in FIGS. 9B and 11. The negative electrode 61 is formed such that the negative electrode active material layer 21a is formed on both surfaces of the negative electrode current collector layer 22. As shown in FIG. 10, the negative electrode 61 includes the negative electrode connection portion 24 which is a region without the negative electrode active material layer 21a on the negative electrode current collector layer 22 and extends in a belt shape. The negative electrode connection portion 24 functions as a negative electrode drawn electrode and is electrically connected to an external electrode (not shown).

In the electrode sheet 41, as shown in FIG. 10, the positive electrode connection portion 14 and the negative electrode connection portion 24 are disposed so as to face each other in a plan view on the longitudinal side surface. As shown in FIG. 10, the first region 45 and the second region 44 are alternately formed between the positive electrode connection portion 14 and the negative electrode connection portion 24 in the longitudinal direction, the first region 45 being formed such that the bag-shaped solid electrolyte layer 30 accommodating the positive electrode piece 13 and the negative electrode 61 are laminated and the second region 44 being formed such that the bag-shaped solid electrolyte layer 30 and the negative electrode 61 are laminated in a laminating order opposite to that of the first region 45. In the first region 45 of the electrode sheet 41 shown in FIGS. 10 and 11, the negative electrode 61 is laminated on the bag-shaped solid electrolyte layer 30. In the second region 44 shown in FIGS. 10 and 11, the bag-shaped solid electrolyte layer 30 is laminated on the negative electrode 61.

In the solid state battery 300 of this embodiment, the electrode sheet 41 shown in FIGS. 10 and 11 is folded in a bellows shape so that the first region 45 and the second region 44 are alternately laminated (see FIG. 9B).

Solid State Battery Manufacturing Method

Next, a method of manufacturing the solid state battery 300 of the third embodiment shown in FIGS. 9A and 9B will be described as an example.

Figure 12:
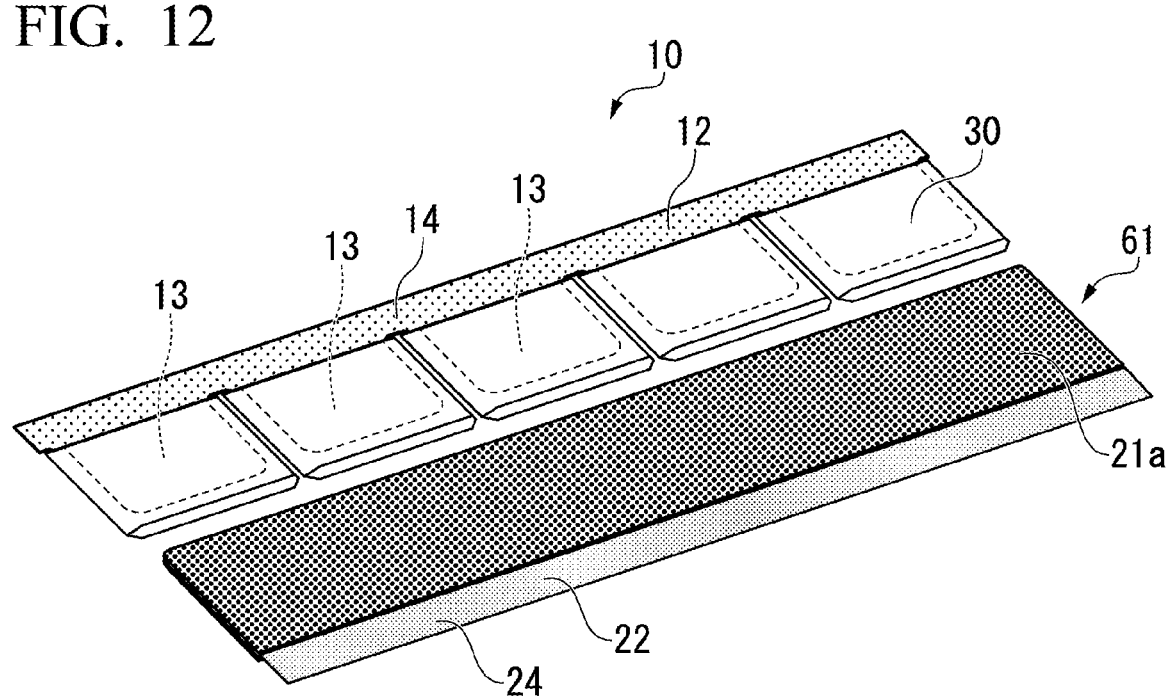
FIG. 12 is an explanatory diagram showing an example of a method of manufacturing the solid state battery of the third embodiment.
Figure 13:
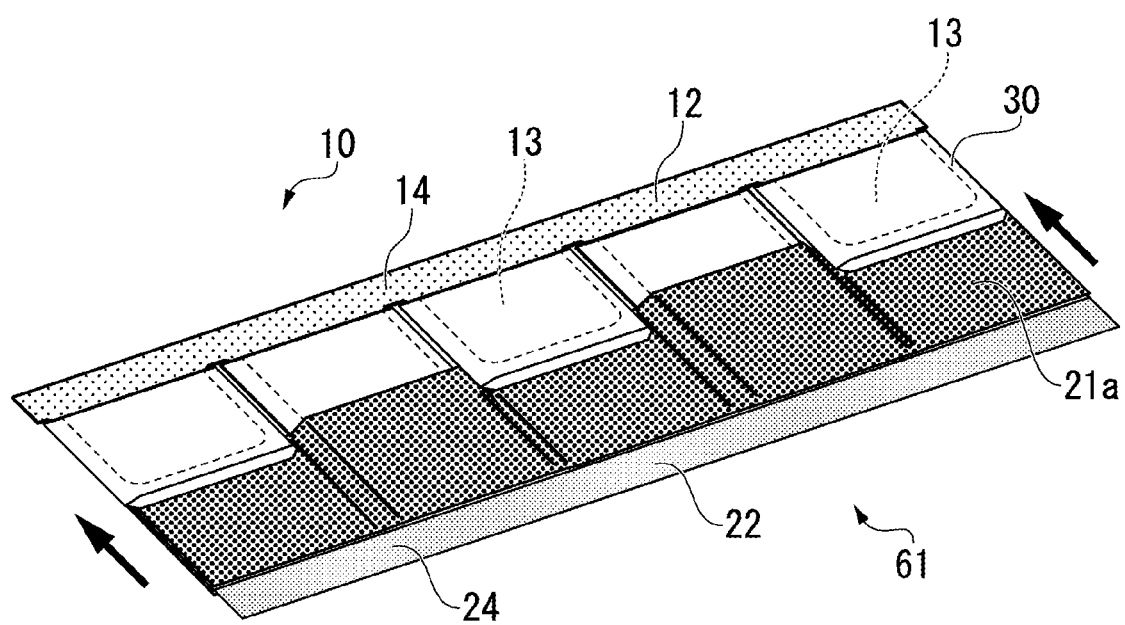
FIG. 13 is an explanatory diagram showing an example of the method of manufacturing the solid state battery of the third embodiment.

FIGS. 12 and 13 are explanatory diagrams showing an example of a method of manufacturing the solid state battery 300 of the third embodiment.

Manufacturing of Negative Electrode

In the method of manufacturing the solid state battery 300 of this embodiment, the negative electrode 61 is manufactured.

As a method of manufacturing the negative electrode 61, for example, similarly to the case of manufacturing the negative electrode sheet 20 used in the solid state battery 100 of the first embodiment, a negative electrode mixture slurry is prepared, the negative electrode mixture slurry is applied to a predetermined position of both surfaces of the negative electrode current collector, a solvent is removed, and a resultant is compressed by a roll pressing machine or the like. Accordingly, the negative electrode 61 having the negative electrode active material layer 21a formed on both surfaces of the negative electrode current collector layer 22 (see FIG. 12) can be obtained.

Next, for example, as shown in FIG. 12, the positive electrode sheet 10 in which each of the plurality of positive electrode pieces 13 is accommodated in the bag-shaped solid electrolyte layer 30 and the negative electrode 61 are disposed so as to face each other in a plan view while the positive electrode connection portion 14 of the positive electrode sheet 10 and the negative electrode connection portion 24 of the negative electrode 61 face outward.

Next, as shown in FIG. 13, the positive electrode sheet 10 and the negative electrode 61 are combined while alternately forming the first region 45 (see FIGS. 10 and 11) in which the bag-shaped solid electrolyte layer 30 and the negative electrode 61 are laminated and the second region 44 (see FIGS. 10 and 11) in which the bag-shaped solid electrolyte layer 30 and the negative electrode 61 are laminated in a laminating order opposite to that of the first region 45 in the longitudinal direction. Accordingly, the electrode sheet 41 shown in FIGS. 10 and 11 is formed.

Next, the electrode sheet 41 shown in FIGS. 10 and 11 is folded in a bellows shape so that the first region 45 and the second region 44 are alternately laminated and the positive electrode piece 13 accommodated in the bag-shaped solid electrolyte layer 30 and the negative electrode 61 are laminated so as to overlap each other in a plan view. Then, the bellows-folded electrode sheet 41 is preferably pressed in the laminating direction by, for example, press-molding.

Subsequently, the positive electrode connection portion 14 is electrically connected to an external electrode (not shown). Further, the negative electrode connection portion 24 is electrically connected to an external electrode (not shown)

Then, if necessary, a protection layer (not shown) is formed on the uppermost layer and/or the lowermost layer of the bellows-folded electrode sheet 41 and is accommodated in an exterior material (not shown) such as a film in a sealed state.

With the above-described steps, the solid state battery 300 of the third embodiment shown in FIGS. 9A and 9B can be obtained.

Since the solid state battery 300 of this embodiment includes the positive electrode piece 13 which has the positive electrode active material layer 11 formed on the positive electrode current collector layer 12 and the negative electrode 61 which has the negative electrode active material layer 21a formed on the negative electrode current collector layer 22 and the positive electrode piece 13 accommodated in the bag-shaped solid electrolyte layer 30 and the negative electrode 61 are laminated so as to overlap each other in a plan view so that the positive electrode active material layer 11 and the negative electrode active material layer 21a are disposed so as to face each other with the solid electrolyte layer interposed therebetween, short-circuiting between the positive electrode piece 13 and the negative electrode 61 can be prevented.

More specifically, in the solid state battery 300 of this embodiment, since the positive electrode piece 13 is accommodated in the bag-shaped solid electrolyte layer 30, short-circuiting hardly occurs even when burrs generated when forming the positive electrode piece 13 and/or the negative electrode 61 exist on the end surfaces of the positive electrode piece 13 and/or the negative electrode 61. Further, short-circuiting between the positive electrode piece 13 and the negative electrode 61 hardly occurs even when the positive electrode active material layer 11 and/or the negative electrode active material layer 12a are cracked or chipped when and/or after manufacturing the solid state battery 300.

In the solid state battery 300 of this embodiment, since the second electrode (the negative electrode 61) has a belt shape in which the negative electrode active material layer 21a is formed on the negative electrode current collector layer 22, there is no need to perform a step of punching the current collector having the second electrode active material layer formed on both surfaces thereof, for example, as in a case in which the second electrode is formed by the plurality of second electrode pieces having the same shape as that of the first electrode piece. Accordingly, it is preferable in that the solid state battery can be easily manufactured by a small number of steps and cracking and chipping of the second electrode active material layer generated by the manufacturing process can be prevented.

Additionally, in the third embodiment, the negative electrode active material layer 21a is formed on the entire area of the negative electrode current collector layer 22 in the longitudinal direction and is also disposed in a curved portion not facing the positive electrode piece 13, but the negative electrode active material layer may be disposed only on a surface facing the positive electrode piece 13. When the negative electrode active material layer is disposed only on the surface facing the positive electrode piece 13, the negative electrode active material layer can be manufactured by, for example, a method in which the negative electrode mixture slurry is intermittently applied onto the negative electrode current collector layer 22, the solvent is removed, and the resultant is compressed by a roll pressing machine or the like.

Other Examples

As described above, the embodiments of the present invention have been described in detail. However, the present invention is not limited to the above-described embodiments and various modifications and changes can be made within the scope of the spirit of the present invention described in the appended claims.

For example, in the solid state batteries 100, 200, and 300 of the above-described embodiments, a case in which all of the plurality of positive electrode pieces 13 and 50 are formed such that the positive electrode active material layer 11 is formed on both surfaces of the positive electrode current collector layer 12 has been described as an example, but the positive electrode piece disposed on the outermost layer of the solid state battery may be formed such that the positive electrode active material layer is formed only on the inside of the positive electrode current collector layer.

Further, in the solid state batteries 100 and 200 of the above-described embodiments, a case in which all of the plurality of negative electrode pieces 23 and 60 are formed such that the negative electrode active material layer 21 is formed on both surfaces of the negative electrode current collector layer 22 has been described as an example, but the negative electrode piece disposed on the outermost layer of the solid state battery may be formed such that the negative electrode active material layer is formed only on the inside of the negative electrode current collector layer.

Further, in the above-described embodiments, a case in which the solid state batteries 100, 200, and 300 are solid-state lithium-ion secondary batteries has been described as an example, but the solid state battery of the present invention may be, for example, a solid sodium ion secondary battery, a solid magnesium ion secondary battery, or the like.

Further, in the above-described embodiments, a case in which the corner portions of the positive electrode pieces 13 and 50 and the negative electrode pieces 23 and 60 are chamfered as a curved surface has been described as an example, but the corner portions of the positive electrode piece and the negative electrode piece of the solid state battery of the present invention may not be chamfered. Then, the shapes of the positive electrode piece and the negative electrode piece can be appropriately set in response to the application or the like of the solid state battery.

For example, in the solid state batteries 100, 200, and 300 of the above-described embodiments, a case in which the first electrode active material layer is the positive electrode active material layer and the second electrode active material layer is the negative electrode active material layer has been exemplified, but in the solid state battery of the present invention, the first electrode active material layer may be the negative electrode active material layer and the second electrode active material layer may be the positive electrode active material layer.

For example, in the solid state batteries 100, 200, and 300 of the above-described embodiments, a case in which the first electrode piece is accommodated by the bag-shaped solid electrolyte layer has been exemplified, but not only the first electrode piece but also the second electrode piece may be accommodated by the bag-shaped solid electrolyte layer.

For example, the bag-shaped solid electrolyte layer may be formed by the solid electrolyte layer sheet in which the solid electrolyte layer is intermittently formed only in the region disposed to face the first electrode active material layer on the porous base material. When forming such a bag-shaped solid electrolyte layer, as a method of bonding the solid electrolyte layer sheets, a pressure-bonding method, a welding method, or both of them may be used.

Further, the bag-shaped solid electrolyte layer may be formed such that the solid electrolyte is filled into a bag-shaped porous base material. Such a bag-shaped solid electrolyte layer can be formed by, for example, a method in which a porous base material is pressure-bonded and/or welded into a bag shape and the bag-shaped porous base material is filled with a solid electrolyte corresponding to the solid electrolyte layer.

EXPLANATION OF REFERENCES 100, 200, 300 Solid state battery
10 Positive electrode sheet (first sheet)
11 Positive electrode active material layer (first electrode active material layer)
12 Positive electrode current collector layer (first current collector layer)
13, 50 Positive electrode piece (first electrode piece)
13a, 13b, 50a, 50b End surface
14 Positive electrode connection portion (first connection portion)
14a Positive electrode drawn electrode
20 Negative electrode sheet
21, 21a Negative electrode active material layer (second electrode active material layer)
22 Negative electrode current collector layer (second current collector layer)
23, 60 Negative electrode piece (second electrode piece)
24 Negative electrode connection portion (second connection portion)
24a Negative electrode drawn electrode
30 Bag-shaped solid electrolyte layer
31 Solid electrolyte layer sheet
40, 41 Electrode sheet
44 Second region
45 First region
61 Negative electrode (second electrode)

What is claimed is:
1. A solid state battery, comprising:
a first electrode piece in which a first electrode active material layer is formed on a first current collector layer;
a second electrode piece in which a second electrode active material layer is formed on a second current collector layer;
a bag-shaped solid electrolyte layer which accommodates the first electrode piece; and
a bellows-folded electrode sheet,
wherein the first electrode piece accommodated in the bag-shaped solid electrolyte layer and the second electrode piece are laminated so as to overlap each other in a plan view so that the first electrode active material layer and the second electrode active material layer are disposed so as to face each other with the bag-shaped solid electrolyte layer interposed therebetween,
wherein the electrode sheet includes a first connection portion which is formed by the first current collector layer and extends in a belt shape, a plurality of the first electrode pieces which are connected to a side surface of the first connection portion and are respectively accommodated in the bag-shaped solid electrolyte layer, a second connection portion which is formed by the second current collector layer and extends in a belt shape, and a plurality of the second electrode pieces which are connected to a side surface of the second connection portion,
wherein the first electrode piece is formed such that the first electrode active material layer is formed on both surfaces of the first current collector layer and the second electrode piece is formed such that the second electrode active material layer is formed on both surfaces of the second current collector layer,
wherein the first connection portion and the second connection portion are disposed so as to face each other in a plan view, and a first region and a second region are alternately formed between the first connection portion and the second connection portion in a longitudinal direction, the first region being formed such that the bag-shaped solid electrolyte layer accommodating the first electrode piece and the second electrode piece are laminated and the second region being formed such that the bag-shaped solid electrolyte layer and the second electrode piece are laminated in a laminating order opposite to that of the first region,
wherein the electrode sheet is folded in a bellows shape so that the first region and the second region are alternately laminated, and
wherein the first connection portion and the second connection portion are formed in a region in which the first electrode active material layer and the second electrode active material layer are not formed.
2. A solid state battery, comprising:
a first electrode piece in which a first electrode active material layer is formed on a first current collector layer;
a second electrode in which a second electrode active material layer is formed on a second current collector layer;
a bag-shaped solid electrolyte layer which accommodates the first electrode piece; and
a bellows-folded electrode sheet,
wherein the first electrode piece accommodated in the bag-shaped solid electrolyte layer and the second electrode are laminated so as to overlap each other in a plan view so that the first electrode active material layer and the second electrode active material layer are disposed so as to face each other with the bag-shaped solid electrolyte layer interposed therebetween, wherein the electrode sheet includes a first connection portion which is formed by the first current collector layer and extends in a belt shape, a plurality of the first electrode pieces which are connected to a side surface of the first connection portion and are respectively accommodated in the bag-shaped solid electrolyte layer, a second connection portion which is formed by the second current collector layer and extends in a belt shape, and the second electrode which is connected to a side surface of the second connection portion and extends in a belt shape, wherein the first electrode piece is formed such that the first electrode active material layer is formed on both surfaces of the first current collector layer and the second electrode is formed such that the second electrode active material layer is formed on both surfaces of the second current collector layer, wherein the first connection portion and the second connection portion are disposed so as to face each other in a plan view and a first region and a second region are alternately formed between the first connection portion and the second connection portion in a longitudinal direction, the first region being formed such that the bag-shaped solid electrolyte layer accommodating the first electrode piece and the second electrode are laminated and the second region being formed such that the bag-shaped solid electrolyte layer and the second electrode are laminated in a laminating order opposite to that of the first region, wherein the electrode sheet is folded in a bellows shape so that the first region and the second region are alternately laminated, wherein the first connection portion and the second connection portion are formed in a region in which the first electrode active material layer and the second electrode active material layer are not formed.

3. The solid state battery according to claim 1, wherein the first electrode active material layer is a positive electrode active material layer and the second electrode active material layer is a negative electrode active material layer.

4. The solid state battery according to claim 1, wherein the bag-shaped solid electrolyte layer is formed by a solid electrolyte layer sheet, and wherein the solid electrolyte layer sheet is disposed so as to cover opposing surfaces of the first electrode piece by being bonded along the opposing surfaces of the first electrode piece.

5. A method of manufacturing the solid state battery according to claim 1, comprising:

forming the electrode sheet including the first connection portion which is formed by the first current collector layer and extends in the belt shape and the plurality of the first electrode pieces which are connected to the side surface of the first connection portion, having the first electrode active material layer formed on both surfaces of the first current collector layer, and having a rectangular shape in a plan view;

disposing a solid electrolyte layer sheet on both surfaces of the first electrode piece so as to continuously cover at least a portion of the plurality of the first electrode pieces by exposing the first connection portion;

bonding the solid electrolyte layer sheet between the adjacent first electrode pieces along end surfaces of the plurality of the first electrode pieces in a direction orthogonal to a longitudinal direction of the electrode sheet; and forming the bag-shaped solid electrolyte layer accommodating each of the plurality of the first electrode pieces by cutting the solid electrolyte layer sheet between adjacent ones of the first electrode pieces of the plurality of first electrode pieces.

6. The solid state battery according to claim 1, wherein the bag-shaped solid electrolyte layer has a configuration in which a solid electrolyte layer sheet having a porous base material and a solid electrolyte held by the porous base material is formed in a bag shape, and wherein the porous base material is formed of nylon, polyester, polyethylene, polypropylene, polytetrafluoroethylene, ethylene-tetrafluoroethylene copolymer, polyvinylidene fluoride, polyvinylidene chloride, polyvinyl chloride, polyurethane, vinylon, polybenzimidazole, polyimide, polyphenylene sulfide, polyetheretherketone, acrylic resin, or glass.

7. The solid state battery according to claim 1, wherein the bag-shaped solid electrolyte layer has a configuration in which a solid electrolyte layer sheet having a porous base material and a solid electrolyte held by the porous base material is formed in a bag shape, and wherein the solid electrolyte is sulfide solid electrolyte, oxide solid electrolyte, lithium-containing salt, or polyethylene oxide.

8. The solid state battery according to claim 1, wherein the first electrode piece has a rectangular shape in a plan view and a corner portion disposed on the side opposite to the first connection portion is chamfered as a curved surface.

9. The solid state battery according to claim 1, wherein the second electrode piece has a rectangular shape in a plan view and a corner portion disposed on the side opposite to the second connection portion is chamfered as a curved surface.

10. The solid state battery according to claim 2, wherein the first electrode piece has a rectangular shape in a plan view and a corner portion disposed on the side opposite to the first connection portion is chamfered as a curved surface.

* * * * *